US012122056B2

(12) United States Patent
Koeppl et al.

(10) Patent No.: US 12,122,056 B2
(45) Date of Patent: Oct. 22, 2024

(54) ELECTRIC BEARD TRIMMER

(71) Applicant: Braun GmbH, Kronberg (DE)

(72) Inventors: Alois Koeppl, Weilrod (DE); Reinhold Eichhorn, Idstein (DE); Jana Schmitt, Wiesbaden (DE); Martin Fuellgrabe, Bad Camberg (DE)

(73) Assignee: Braun GMBH, Kronberg (DE)

( * ) Notice: Subject to any disclaimer, the term of this patent is extended or adjusted under 35 U.S.C. 154(b) by 0 days.

(21) Appl. No.: 17/157,869

(22) Filed: Jan. 25, 2021

(65) Prior Publication Data

US 2021/0229303 A1 Jul. 29, 2021

(30) Foreign Application Priority Data

Jan. 23, 2020 (EP) .................................... 20153377

(51) Int. Cl.
*B26B 19/38* (2006.01)
*B26B 19/04* (2006.01)
(Continued)

(52) U.S. Cl.
CPC ........ *B26B 19/3846* (2013.01); *B26B 19/046* (2013.01); *B26B 19/10* (2013.01);
(Continued)

(58) Field of Classification Search
CPC ....... B26B 19/02; B26B 19/04; B26B 19/042; B26B 19/06; B26B 19/063; B26B 19/38; B26B 19/3846
(Continued)

(56) References Cited

U.S. PATENT DOCUMENTS 1,567,110 A 12/1925 Bristow
1,875,125 A 8/1932 John et al.
(Continued)

FOREIGN PATENT DOCUMENTS

CH 160230 A 2/1933
CN 1034327 A 8/1989
(Continued)

OTHER PUBLICATIONS

International Search Report and Written Opinion; Application Ser. No. PCT/IB2021/050555; dated Apr. 20, 2021, 14 pages.
(Continued)

*Primary Examiner* — Jason Daniel Prone
(74) *Attorney, Agent, or Firm* — Kevin C. Johnson; Andrés E. Velarde

(57) ABSTRACT

The present invention relates to a cutter system for an electric shaver and/or trimmer. The cutter system includes a pair of comb-like cutting elements with cooperating toothed cutting edges and movably supported relative to each other by a support element, wherein lateral ends of at least one of the cutting elements are provided with lateral protection elements having rounded and/or chamfered edge contours for soft skin engagement. The lateral protection element is integrally formed in one part with the cutting element by an end portion of the cutting element bent away from a skin contact surface thereof and enveloping a gap movably receiving the other cutting element and/or enveloping the support element.

12 Claims, 18 Drawing Sheets

(51) Int. Cl.
*B26B 19/10* (2006.01)
*B26B 19/20* (2006.01)
*B26B 19/06* (2006.01)

(52) U.S. Cl.
CPC ........ *B26B 19/205* (2013.01); *B26B 19/3893* (2013.01); *B26B 19/06* (2013.01)

(58) Field of Classification Search
USPC ................................................ 30/43.7–43.92
See application file for complete search history.

(56) References Cited

U.S. PATENT DOCUMENTS

| | | | | |
|---|---|---|---|---|
| 2,246,586 | A | 6/1941 | Hanley | |
| 2,249,825 | A | 7/1941 | Hanley | |
| 2,273,739 | A * | 2/1942 | Pas | B26B 19/042 30/43.92 |
| 2,713,718 | A | 7/1955 | Hudson | |
| 2,859,513 | A | 11/1958 | Bylund | |
| 3,271,854 | A | 9/1966 | Gerrit | |
| 3,279,056 | A | 10/1966 | Mathew | |
| 3,467,204 | A | 9/1969 | Jenkinson | |
| 4,011,692 | A | 3/1977 | Bos et al. | |
| 4,614,032 | A | 9/1986 | Szabo | |
| 4,796,359 | A | 1/1989 | Oprach et al. | |
| 4,951,394 | A | 8/1990 | Meijer | |
| 5,600,890 | A | 2/1997 | Leitner et al. | |
| 5,819,415 | A | 10/1998 | Bruggers et al. | |
| 6,317,982 | B1 | 11/2001 | Andrew | |
| 6,530,150 | B1 | 3/2003 | Barish | |
| 6,658,740 | B2 | 12/2003 | Habben | |
| D672,923 | S | 12/2012 | Loudenback et al. | |
| D672,924 | S | 12/2012 | Amice et al. | |
| 8,393,082 | B2 | 3/2013 | Shimizu | |
| 8,479,400 | B2 | 7/2013 | Fukutani et al. | |
| 9,156,173 | B2 | 10/2015 | Fuerst et al. | |
| 9,302,401 | B2 | 4/2016 | Geiser et al. | |
| 9,381,656 | B2 * | 7/2016 | Van Straaten | B26B 19/38 |
| 9,427,881 | B2 | 8/2016 | Floessholzer | |
| 9,789,617 | B2 * | 10/2017 | Stapelbroek | B26B 19/06 |
| 10,081,114 | B2 | 9/2018 | Sablatschan | |
| 10,213,930 | B2 | 2/2019 | Bady et al. | |
| 10,252,429 | B2 | 4/2019 | Sablatschan et al. | |
| 10,391,647 | B2 | 8/2019 | Phoon et al. | |
| 10,647,010 | B2 | 5/2020 | Sablatschan | |
| 10,682,777 | B2 * | 6/2020 | Huisman | B26B 19/3846 |
| 10,702,999 | B2 | 7/2020 | Iaccarino et al. | |
| 10,857,686 | B2 * | 12/2020 | Wu | B26B 19/063 |
| 11,104,016 | B2 * | 8/2021 | Musallam | B26B 19/042 |
| 11,179,861 | B2 * | 11/2021 | Khubani | B26B 19/3846 |
| 11,298,841 | B2 | 4/2022 | De Haas et al. | |
| 11,318,629 | B2 * | 5/2022 | Godlieb | B26B 19/3846 |
| 11,351,684 | B2 * | 6/2022 | Phoon | B26B 19/063 |
| 11,370,134 | B2 * | 6/2022 | Phoon | B26B 19/06 |
| 11,453,137 | B2 * | 9/2022 | Godlieb | B26B 19/06 |
| 11,465,303 | B2 * | 10/2022 | Stapelbroek | B26B 19/06 |
| 2002/0129496 | A1 | 9/2002 | Habben | |
| 2006/0225290 | A1 | 10/2006 | Bader et al. | |
| 2009/0119932 | A1 | 5/2009 | Lau | |
| 2010/0299937 | A1 | 12/2010 | Geiser et al. | |
| 2011/0010941 | A1 | 1/2011 | Lau et al. | |
| 2011/0010942 | A1 | 1/2011 | Lau | |
| 2011/0016723 | A1 | 1/2011 | Maichel et al. | |
| 2014/0310963 | A1 | 10/2014 | Geiser et al. | |
| 2014/0317932 | A1 | 10/2014 | Van Straaten et al. | |
| 2015/0183118 | A1 | 7/2015 | Roth | |
| 2015/0314461 | A1 | 11/2015 | Man Wong et al. | |
| 2016/0229072 | A1 | 8/2016 | Stapelbroek et al. | |
| 2016/0236361 | A1 | 8/2016 | Stapelbroek et al. | |
| 2016/0236362 | A1 | 8/2016 | Stapelbroek et al. | |
| 2016/0236363 | A1 | 8/2016 | Stapelbroek et al. | |
| 2016/0271814 | A1 | 9/2016 | Bennik et al. | |
| 2017/0028576 | A1 | 2/2017 | Sablatschan | |
| 2017/0050326 | A1 | 2/2017 | Lau | |
| 2017/0113361 | A1 * | 4/2017 | Feijen | B26B 19/06 |
| 2017/0144319 | A1 * | 5/2017 | Sablatschan | B26B 19/3846 |
| 2017/0246751 | A1 | 8/2017 | Vredeveld et al. | |
| 2017/0259439 | A1 | 9/2017 | Van Eibergen Santhagens et al. | |
| 2018/0009121 | A1 | 1/2018 | Stapelbroek et al. | |
| 2018/0085945 | A1 | 3/2018 | Bady et al. | |
| 2018/0099427 | A1 | 4/2018 | Huisman et al. | |
| 2018/0104834 | A1 | 4/2018 | Zuidervaart et al. | |
| 2018/0257248 | A1 * | 9/2018 | Wu | B26B 19/063 |
| 2020/0164533 | A1 * | 5/2020 | Phoon | B26B 19/3846 |
| 2020/0316793 | A1 | 10/2020 | Phoon | |
| 2020/0316794 | A1 * | 10/2020 | Phoon | B26B 19/06 |
| 2020/0331157 | A1 | 10/2020 | Godlieb et al. | |
| 2020/0376695 | A1 | 12/2020 | Feijen et al. | |
| 2021/0229300 | A1 | 7/2021 | Koeppl et al. | |
| 2021/0229301 | A1 * | 7/2021 | Koeppl | B26B 19/3846 |
| 2021/0229302 | A1 | 7/2021 | Koeppl et al. | |
| 2021/0229304 | A1 * | 7/2021 | Koeppl | B26B 19/3846 |
| 2021/0237289 | A1 | 8/2021 | Koeppl et al. | |
| 2021/0260781 | A1 | 8/2021 | Koeppl et al. | |
| 2021/0260782 | A1 | 8/2021 | Koeppl et al. | |
| 2021/0260783 | A1 * | 8/2021 | Koeppl | B26B 19/3846 |
| 2021/0347069 | A1 * | 11/2021 | Röder | B26B 19/063 |
| 2021/0347070 | A1 * | 11/2021 | Röder | B26B 19/042 |
| 2021/0347071 | A1 * | 11/2021 | Xu | B26B 19/3846 |
| 2021/0347072 | A1 * | 11/2021 | Xu | B26B 19/3846 |
| 2021/0347076 | A1 * | 11/2021 | Xu | B26B 19/3846 |
| 2023/0019742 | A1 | 1/2023 | Xu et al. | |
| 2024/0139980 | A1 | 5/2024 | Koeppl et al. | |

FOREIGN PATENT DOCUMENTS

| | | | | |
|---|---|---|---|---|
| CN | 1525902 | A | 9/2004 | |
| CN | 201471463 | U | 5/2010 | |
| CN | 102328321 | A | 1/2012 | |
| CN | 103079779 | A | 5/2013 | |
| CN | 103468914 | A | 12/2013 | |
| CN | 203765658 | U | 8/2014 | |
| CN | 104245253 | A | 12/2014 | |
| CN | 104999486 | A | 10/2015 | |
| CN | 206105917 | U | 4/2017 | |
| CN | 206 287 174 | | 6/2017 | |
| CN | 206633052 | U | 11/2017 | |
| CN | 107639657 | A | 1/2018 | |
| CN | 207139864 | U | 3/2018 | |
| CN | 108724253 | A | 11/2018 | |
| CN | 108858297 | A | 11/2018 | |
| CN | 109789585 | A | 5/2019 | |
| CN | 208914177 | U | 5/2019 | |
| CN | 110 091 364 | | 8/2019 | |
| CN | 209364682 | U | 9/2019 | |
| CN | 110562534 | A | 12/2019 | |
| DE | 622922 | C | 12/1935 | |
| DE | 202008002467 | U1 | 4/2008 | |
| DE | 202013103187 | U1 | 7/2013 | |
| EP | 0070489 | A1 | 1/1983 | |
| EP | 0282117 | A1 | 9/1988 | |
| EP | 0652084 | A1 | 5/1995 | |
| EP | 0652085 | A1 | 5/1995 | |
| EP | 2 085 195 | | 8/2009 | |
| EP | 2845476 | A1 | 3/2015 | |
| EP | 2857154 | A1 | 4/2015 | |
| EP | 3090844 | A1 | 11/2016 | |
| EP | 3388207 | A1 | 10/2018 | |
| EP | 3415288 | A1 | 12/2018 | |
| EP | 3466619 | A1 * | 4/2019 | B26B 19/3846 |
| EP | 3900896 | A1 | 10/2021 | |
| GB | 2517938 | A | 3/2015 | |
| JP | S5030989 | A | 3/1975 | |
| JP | S5492455 | A | 7/1979 | |
| JP | 2005052556 | A | 3/2005 | |
| JP | 2007044300 | A | 2/2007 | |
| WO | 0051793 | A1 | 9/2000 | |
| WO | 2009024900 | A1 | 2/2009 | |
| WO | 2016042158 | A1 | 3/2016 | |
| WO | 2016134979 | A1 | 9/2016 | |

(56) References Cited

FOREIGN PATENT DOCUMENTS

| | | | | | |
|---|---|---|---|---|---|
| WO | 2016184874 | A1 | | 11/2016 | |
| WO | WO-2019110335 | A1 | * | 6/2019 | ............. B26B 19/06 |

OTHER PUBLICATIONS

International Search Report and Written Opinion; Application Ser. No. PCT/IB2021/050556; dated Apr. 20, 2021, 14 pages.
Extended EP Search Report and Written Opinion for 21153240.3 dated Jun. 14, 2021, 5 pages.
European search report dated Sep. 1, 2020.

* cited by examiner

ELECTRIC BEARD TRIMMER

FIELD OF THE INVENTION

The present invention relates to cutting body hair such as beard stubbles of multidays' beard. More particularly, the present invention relates to a cutter system for an electric shaver and/or trimmer, comprising a pair of comb-like cutting elements with cooperating toothed cutting edges and movably supported relative to each other by a support element, wherein lateral ends of at least one of said cutting elements are provided with lateral protection elements having rounded and/or chamfered edge contours for soft skin engagement. The present invention also relates to a method of manufacturing such cutter system and to an electric shaver and/or trimmer provided with such a cutter system.

BACKGROUND OF THE INVENTION

Electric shavers and trimmers utilize various mechanisms to provide hair cutting functionality. Some electric shavers include a perforated shear foil cooperating with an undercutter movable relative thereto so as to cut hairs entering the perforations in the shear foil. Such shear foil type shavers are often used on a daily basis to provide for a clean shave wherein short beard stubbles are cut immediately at the skin surface.

On the other hand, other cutter systems including a pair of cooperating comb-like cutting elements with a plurality of comb-like or rake-like cutting teeth reciprocating or rotating relative to each other, are often used for cutting longer beard stubbles or problem hair that is difficult to cut due to, for example, a very small angle to the skin or growing from very resilient skin. The teeth of such comb-like or rake-like cutting elements usually project substantially parallel to each other or substantially radially, depending on the type of driving motion, and may cut hairs entering into the gaps between the cutting teeth, wherein cutting or shearing is achieved in a scissor-like way when the cutting teeth of the cooperating elements close the gap between the finger-like cutting teeth and pass over each other.

Such cutter systems for longer hairs may be integrated into electric shavers or trimmers which at the same time may be provided with the aforementioned shear foil cutters. For example, the comb-like cutting elements may be arranged, e.g., between a pair of shear foil cutters or may be arranged at a separate, extendable long hair cutter. On the other hand, there are also electric shavers or trimmers or styling apparatus which are provided only with such comb-like cutting elements. So as to allow for easy positioning of the toothed cutting edges at the hair and skin portions to be treated, the cutter system may have an exposed position not surrounded by housing parts and/or may be extended to be not-obstructed by such housing parts or other neighboring elements.

For example, EP 24 25 938 B1 shows a shaver with a pair of long hair trimmers integrated between shear foil cutters. Furthermore, EP 27 47 958 B1 discloses a hair trimmer having two rows of cooperating cutting teeth arranged at opposite sides of the shaver head, wherein the cutting teeth of the upper comb-like cutting element are provided with rounded and thickened tooth tips overhanging the tooth tips of the lower cutting element so as to prevent the projecting tooth tips from piercing into the skin and from irritating the skin. A similar cutter system is shown in US 2017/0050326 A1 wherein in such cutter system the lower comb-like cutting element is fixed and the upper comb-like cutting element is movable. CN 206 287 174 U discloses a beard trimmer having a pair of cooperating comb-like cutting elements each of which is provided with two rows of projecting cutting teeth, wherein the upper cutting element defining the skin contact surface has cutting teeth provided with thickened and rounded tooth tips overhanging the teeth of the lower cutting element. Said thickened and rounded tooth tips are curved away from the skin contact surface and do not protrude towards the skin contact surface so as to have the skin indeed directly contact the main portion of the cutting teeth to cut the beard stubbles close to the skin surface.

Due to the often exposed arrangement of the blades, not only the tips of the teeth, but also the lateral edges of the cutting elements may cause skin irritations. Such lateral ends which extend basically transverse to the toothed cutting edges often include rather sharp edges due to the thin blade-like cutting elements often made from thin metal sheets. When the cutter system glides along the skin surface, said lateral edges may irritate the skin even when the corners or transition portions from the lateral edges to the toothed edges are rounded. In order to avoid such skin irritations, lateral protection elements may be attached to said lateral ends of the cutter elements, wherein such lateral protection elements may form caps covering the lateral ends of the cutting blade and usually have rounded and/or chamfered contours to provide for a soft skin engagement.

For example, EP 30 71 376 B1 discloses lateral protection caps made from plastic by injection molding and attached to the stationary, upper cutting blade, wherein such lateral protection cap includes an open recess into which a cutting element, with its lateral end portion, may be inserted, wherein it is also proposed to attach the protection cap by means of overmolding the blade with the plastic material forming the protection end cap. In addition to such overmolded end caps, EP 24 25 938 B1 suggests pipe-shaped bumpers as lateral protection elements extending along the lateral end portions of the cutting elements.

Such lateral protection elements, on the one hand, should reliably protect the skin against irritations and therefore, the lateral end protection elements usually include rather large roundings and chamfered contours which, however, often make the protection elements bulky and increasing the size of the end portions. On the other hand, such lateral protection elements should not interfere with the cutting action. In particular, the protection elements should not detrimentally affect closeness and thoroughness of the cutting action what may be the case if the protection elements significantly protrude beyond the skin contact surface of the cutting blade.

Aside from such skin protection and safety issues, beard stubble trimmers need to address quite different and diverging functional requirements and performance issues such as closeness, thoroughness, good visibility of the cutting location, efficiency and pleasant skin feel, good ergonomics and handling. Closeness means short or very short remaining stubbles, whereas thoroughness means less missed hairs particularly in problem areas like the neck. Efficiency means less and faster strokes suffice to achieve the desired trimming result. Pleasant skin feel depends on the individual user, but often includes less irritation in form of nicks, cuts or abrasion and better gliding onto the skin. Visibility of the cutting location is particularly important in case of styling or edging contours to accomplish hair removal with a local accuracy of the magnitude of, for example, 1 mm.

Fulfilling such various performance issues at the same time is quite difficult.

SUMMARY OF THE INVENTION

It is an objective underlying the present invention to provide for an improved cutter system avoiding at least one of the disadvantages of the prior art and/or further developing the existing solutions. A more particular objective underlying the invention is to provide for a close and thorough cutting of longer stubbles and hair including a good control of edging contours and, at the same time, avoiding skin irritations and achieving comfortable gliding along the skin. Another objective underlying the present invention is an efficient manufacturing of the lateral protection elements. Still further objective is a support structure for supporting the cooperating cutting elements with low friction between the cutting elements, low temperatures of the cutting teeth and low energy consumption and thus long energy storage life, and at the same time allowing for easy assembling of the cutter elements with the lateral protection elements.

To achieve at least one of the aforementioned objectives, specifically configured lateral protection elements are provided to protect the lateral ends of the cutter system without interfering with the cutting action. According to an aspect, said lateral protection element is integrally formed in one part with the cutting element by an end portion of said cutting element and bent or curved away from the skin contact surface and enveloping a gap receiving the other cutting element and/or the support element supporting the cutting elements. So as to avoid the protrusion of a plastic end cap slipped onto the cutting element and protruding towards the skin to be contacted, the lateral end portions of the cutting element may be bent or curved away from the skin contact surface to form the rounded and/or chamfered lateral protection element themselves. More particularly, the lateral protection elements may be formed homogeneously with and/or from the same material as the cutting element including the toothed cutting edges, wherein forming the lateral protection elements by means of bending may avoid separate connection means and also connection steps like welding. Thus, the number of assembling steps may be reduced and deformation of the cutting blade due to thermal loads resulting from welding may be avoided. At the same time, the skin contact surface of the cutting element including the lateral protection elements may be substantially flat and/or without protection towards the skin to be contacted. The term "bent" in this and the following context can be substituted by "curved" and only optionally but not necessarily may also refer to the process of bending in order to create the curved or bent shape.

According to another aspect, the lateral protection element having the rounded and/or chamfered edge contours for soft skin engagement are made from a metal sheet having a sheet thickness of less than 200 μm. In contrast to injection molded plastic caps usually having a thickness of at least 300 μm, such metal sheet protection elements do not only allow for reducing the amount of protrusion from the comb surface toward the skin, but also achieve a comfortable feel at the skin due to having the same temperature as the cutting element and allowing for smooth, comfortable gliding along the skin.

According to a still further aspect, the lateral protection element may be formed in part by the cutting element and in part by said support element which may protrude at least laterally beyond the cutting element, wherein the cutting element and the support element together define a rounded and/or chamfered protection contour for soft skin engagement.

According to another aspect, closeness and thoroughness of the cutting action may be combined with a pleasant skin feel with comfortable gliding along the skin avoiding skin irritations, by means of a two-step rounding of the overhanging tooth tips including a spherical or drop shaped or pearl-shaped thickening and a bent tooth portion connecting said thickening to a main tooth portion and bent away from the skin contact surface of said main tooth portion. Bending the teeth away from the skin contact surface in addition to the provision of a substantially spherical or drop shaped thickening at the outermost tip portion reliably prevents skin piercing and skin irritations even when using smaller sized thickening and/or rounding contours, but nevertheless allows for closeness and thoroughness of the cutting action.

Such bending of the tooth tips may be effected together with bending of the lateral ends of the cutting element for forming the lateral protection elements, in one processing step or in separate steps one after the other, wherein the tooth tips and the lateral end portions may be bent into the same direction. More particularly, the same holding tool holding the cutting element and/or the same bending tool may be used for bending the tooth tips and the lateral end portions.

These and other advantages become more apparent from the following description giving reference to the drawings and possible examples.

DETAILED DESCRIPTION OF THE INVENTION

Figure 1A:
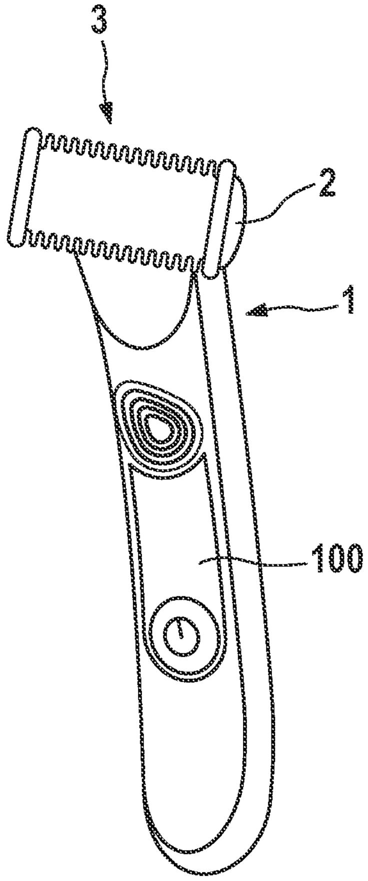
FIG. 1*a*-1*b*: a perspective view (left view 1*a*) of an electric beard trimmer including a cutting system with a pair of cooperating comb-like cutting elements reciprocating relative to each other and a side view of said trimmer applied onto human skin (right view 1*b*)

So as to avoid steps and/or protrusions at the skin contact surface detrimental to close and thorough cutting, at least one of said lateral protection elements may be integrally formed in one part with the cutting element by an end portion of said cutting element bent or curved away from the skin contact surface and enveloping a gap receiving the other cutting element and/or enveloping the support element supporting the cutting elements. So as to avoid the protrusion of a plastic end cap slipped onto the cutting element and protruding towards the skin to be contacted, the lateral end portions of the cutting element may be bent or curved away from the skin contact surface to form the rounded and/or chamfered lateral protection element themselves. More particularly, the lateral protection elements may be formed homogeneously with and/or from the same material as the cutting element including the toothed cutting edges, wherein forming the lateral protection elements by means of bending may avoid separate connection means and also connection steps like welding. Thus, the number of assembling steps may be reduced and deformation of the cutting blade due to thermal loads resulting from welding may be avoided. At the same time, the skin contact surface of the cutting element including the lateral protection elements may be substantially flat and/or without protection towards the skin to be contacted Said end portion of the cutting element bent away from the skin contact surface and forming the rounded and/or chamfered lateral protection element may have an outer contour which, when viewed perpendicular to the skin contact surface, may have an L-shape or a U-shape with a first protective portion extending at the toothed cutting edge of the cutting element, a second protective portion extending along the lateral end and a rounded corner portion connecting said first and second protective portions. If there is only one toothed cutting edge, an L-shape may may provide sufficient protection, while a U-shape may provide protection for two toothed cutting edges extending along opposite sides of the cutting system. All said portions, i.e. the first, second and rounded corner portions may include bending portions bent away from the skin contact surface and forming a flange having the aforementioned L- or U-shape and extending, at least to some extent, transverse to the skin contact surface.

So as to facilitate bending of the end portions of the cutting element to form said lateral protection element, a seaming portion which may be the transition portion between the skin contact surface and the rounded and/or chamfered bending portion and which may connect said bend portion to the substantially flat main portion of the cutting element, may have a reduced thickness in comparison to said main portion and to said bend portion and/or may include a groove-like notch along a path following the contour of the bending portion. Such weakened and/or thinned seaming portion prevents the bending portion from wrinkling, in particular when bending the lateral end portions of the cutting element in a multiaxial way to achieve the aforementioned L- or U-shape.

The aforementioned main portion and the bent portion which are on opposite sides of the thinned seaming portion may have the substantially same thickness.

In addition or in the alternative to such weakening or thinning the blade material at the root region from which the bending extends, at least one slit may be provided in the rounded corner portion to facilitate bending in the corner region. More particularly, before bending, one or more cutouts which may be roughly V-shaped, may be provided in the lateral end portions of the cutting element, wherein, when bending said lateral end portions, the edges of the V-cutouts may join each other and/or abut against each other and/or at least come close to each other.

After bending, such slit may be closed, for example, by means of filling the slit with a filler material such as a glue.

The lateral protection elements may protrude only away from the skin contact surface so that there is no protrusion towards the skin to be contacted.

A lateral bending radius may be larger than, for example, 500 μm or may range from 500 to 1500 μm or 600 to 900 μm what smoothly guides the skin around the lateral end portions of the cutter system.

A vertical bending radius describing the bending curvature about a bending axis substantially parallel to the skin contact surface may be larger than 400 μm or may range from 400 to 1000 μm or 500 to 800 μm. Such vertical bending radius reliably prevents the skin from irritations and achieves smooth, comfortable gliding over the skin, wherein, at the same time, the bending process of bending the material of the cutting element is efficiently handled.

According to another aspect, the lateral protection element having the rounded and/or chamfered edge contours for soft skin engagement are made from a metal sheet having a sheet thickness of less than 200 μm. In contrast to injection molded plastic caps usually having a thickness of at least 300 μm, such metal sheet protection elements do not only allow for reducing the amount of protrusion from the comb surface toward the skin, but also achieve a comfortable feel at the skin due to having the same temperature as the cutting element and allowing for smooth, comfortable gliding along the skin.

Such lateral protection elements made from metal sheet may envelop the cutting element at the lateral end portion thereof, and may also envelop the gap in which the other cutting element is movably received and/or the support element which is supporting the cutting elements.

In particular, such metal sheet lateral protection element also may envelop a bottom surface of said support element, thereby rigidly holding the cutting element and the support element together. The lateral protection element made from metal sheet may extend on four sides of the package including the cutting elements and the support element.

Irrespective of the enveloping configuration, said lateral protection element may have two open lateral sides one of which may face a center of the cutter element and the other one may face away from the center of the cutter element. In particular, also the lateral end side may be formed open. Irrespective of such open side, the lateral protection element made from metal sheet may be ring-shaped.

According to a still further aspect, the lateral protection element may be formed in part by the cutting element and in part by said support element which may protrude at least laterally beyond the cutting element, wherein the cutting element and the support element together define a rounded and/or chamfered protection contour for soft skin engagement.

The cutting element and the support element both may have an L-shaped or U-shaped contour at their lateral end portions and together define a first protective portion extending at the toothed cutting edge, a second protective portion extending along the lateral end and a rounded corner portion connecting said first and second protective portions.

At all said portions, i.e. the first, second and corner protective portions, the support element may project beyond the contour of the cutting element and/or the support element and the cutting element together may form a rounded and/or chamfered contour for soft skin engagement.

A gap between the support element and the cutting element which together define said chamfered and/or rounded protective contour, may be filled with a filler material such as a glue, wherein the filler material may form a part of the protective rounded and/or chamfered contour for soft skin engagement.

To avoid skin irritations not only in the region of the lateral ends, but also at the toothed cutting edges during hair cutting, at least one cutting element may have cutting teeth with thickened and/or rounded tooth tips overhanging the teeth of the other cutting element. Such overhanging tooth tips may be provided with a two-step rounding including a spherical or drop-shaped or pearl-shaped thickening and a bent portion connecting said thickening to a main portion of the corresponding tooth and bent away from the skin contact surface of said main tooth portion. Such double-rounded configuration including the rounding of the thickening and the curved or bent configuration of the neighboring tooth portion to which the thickening is attached, may combine closeness and thoroughness of the cutting action with a pleasant skin feel avoiding skin irritations. More particularly, bending the teeth away from the skin contact surface in addition to the provision of a substantially spherical and thus round thickening at the outermost tip portion reliably prevents skin piercing and skin irritations even when the thickening is of a smaller contour which, on the other hand, helps in achieving closeness and thoroughness.

Bending of the tooth tips may be effected together with the bending of the lateral end portions of the cutting element in one processing step or in separate steps one after the other, wherein the tooth tips and the lateral end portions may be bent into the same direction. More particularly, the same holding tool holding the cutting element and/or the same bending tool may be used for bending the tooth tips and the lateral end portions.

Said substantially spherical thickening may form the very outermost tip portion, wherein the neighboring, more inwardly positioned tip portion may be curved away from the skin contact surface of the main tooth portion. Said more inwardly positioned tip portion is still part of the tooth tip, but is not yet part of the thickening and may have a substantially flat, plate-like configuration with a thickness comparable to or the same as the inner portions or main portion of the cutting tooth.

Said inner or main portion of the cutting teeth providing for the cutting action due to the other, cooperating teeth closing the gap and passing the teeth of the other cutting element, may have a substantially elongated, plate-like configuration with at least substantially parallel cutting edges formed by longitudinal edges of the tooth body. At the tip of such parallelepiped like tooth main portion, the substantially spherical thickening may be attached forming the tip of the teeth.

In particular, the two-step rounding provides for excellent cutting performance when the cutter system is used in the rake mode as well as in the fork mode. When used in the fork mode, i.e. the teeth, with their main tooth portion, being substantially parallel to and/or tangential to and/or touching the skin, helps in keeping the skin wave 54 small which skin wave is created when sliding the cutter system along the skin surface. Due to the bending of the tooth tip portion neighboring the thickening away from the skin contact surface, friction between the thickening and the skin can be reduced. On the other hand, when using the cutter system in the rake mode, i.e. positioning the cutting teeth, with their longitudinal axis, substantially perpendicular to the skin, the substantially spherical thickening guides the pair of cutting elements along the skin surface and achieves a substantially soft cutting procedure.

The bend teeth portion connecting the spherical thickenings to the main portion of the teeth, may be configured to have a radius of curvature or bending radius which is smaller than 400 μm.

More particularly, the bending radius of said bend tooth portion may range from 200 to 400 μm or 250 to 350 μm.

The thickenings may have a diameter ranging from 300 to 550 μm or 350 to 500 μm.

When the cutter system is used like a rake with the cooperating teeth extending substantially perpendicular to the skin to be shaved, it may be helpful to have a sufficiently long overhang of the thickened and/or rounded tooth tips of the standing, not reciprocating or not rotating cutting element to prevent the reciprocating or rotating teeth of the other cutting element from touching and irritating the skin. Such overhanging length defining the length of protrusion of the overhanging tooth tips beyond the tooth tips of the other cutting element, may range from 400 to 800 μm or 400 to 600 μm.

So as to allow for a close cut, the teeth may have a rather reduced thickness and/or the thickness of the teeth may be adjusted to the gap between pairs of neighboring cutting teeth. Usually, the skin to be shaved bulges when the cutter system is pressed against the skin to be shaved. More particularly, the skin may bulge into the gaps between the cutting teeth which depress or dent the skin in contact with the teeth bodies. Due to such bulging effect of the skin, it may be advantageous to have a teeth thickness, at a main portion of the teeth providing the cutting action, ranging from 50 to 150 or 30 to 180 μm. In addition or in the alternative, the width of a gap between neighboring cutting teeth may have a gap width ranging from 150 to 550 or 200 to 500 μm. In addition or in the alternative, the teeth may have a width ranging from 200 to 600 μm or 250 to 550 μm.

So as to achieve a smooth, comfortable cutting action, it is helpful to avoid separating the cutting elements and the cooperating teeth from one another so as to avoid that hair is no longer properly cut or even clamped between the teeth moving relative to each other. Basically, this can be prevented by means of pressing the cooperating teeth against each other, for example by means of spring devices urging the teeth of one cutting element against the teeth of the other cutting element. However, large contact pressure between the cooperating teeth increases the friction what causes heat. Such heating of the cutting elements is, however, irritating the skin and makes the user feel uncomfortably at least. Moreover, increasing the contact pressure and thus the friction also increases the energy necessary to drive the cutting elements relative to each other and thus, reduces battery life.

In order to combine reliable and comfortable cutting without pulling and tugging hairs on the one hand with efficient movability of the cutting elements with reduced friction, reduced heat generation and thus extended battery life on the other hand, the cutting elements may be supported relative to each other by means of an improved support structure. More particularly, one of the cutting elements may be sandwiched between the other cutting element and a support element or support structure like a support frame which may include a spacer precisely and rigidly holding the outer cutting element at a predetermined distance from the support element, thereby defining a gap in which the sandwiched cutting element is slidably and/or movably received, wherein said spacer and thus said gap may be slightly thicker than the sandwiched cutting element to provide for some play to reduce friction to reduce heat generation. Although the sandwiched cutting element may move relative to the other cutting element without friction or at very low friction, it is nevertheless prevented from deflection even when the thickness of the sandwiched cutting element is very small. To achieve low friction and avoid clamping of hairs between the cutting teeth at the same time, said spacer may have a thickness which is larger than the thickness of the sandwiched cutting element only by an amount smaller than the thickness of hair to be cut.

More particularly, the amount by which the thickness of the spacer exceeds the thickness of the sandwiched cutting element may be less than 40 μm. For example, it may range from 20 μm to 40 μm. Such configuration is a good compromise between still easy manufacturing and sufficiently small risk of pulling and tugging hair to be cut.

The aforementioned spacer may provide for a double function. It may not only precisely define the gap in which the sandwiched cutting element is received, but also may form a sliding guide for guiding the sandwiched cutting element which may reciprocate along said spacer.

More particularly, the sandwiched cutting element may include a guiding recess in which the spacer forming the sliding guide is received. The contours or edges of said guiding recess may slide along the outer contours of the spacer received in the guiding recess, thus achieving guidance for the reciprocating movement. At the same time, arranging the spacer in such recess provides for a precise definition of the gap all along the surrounding contours of the cutting element. More particularly, the centrally located spacer may keep the width of the gap constant and may rigidly hold the other cutter element at the desired distance so that the sandwiched cutting element is sufficiently supported to be prevented from deflection and, in addition, prevented from high friction.

The spacer may be rigidly connected to the support element and/or to the cutting element which is not reciprocating and not rotating.

The sandwiched cutting element may be the driven cutting element which may reciprocate or rotate, depending of the type of drive.

Basically, each of the cooperating cutting elements may be driven. However, to combine an easy drive system with safe and soft cutting action, the upper or outer cutting element having the skin contact surface and/or the overhanging tooth tips may be standing and/or may be not reciprocating and not rotating, whereas the lower cutting element which may be the sandwiched cutting element, may reciprocate or rotatorily oscillate.

So as to give the user the choice between a more aggressive, closer cutting action on the one hand and a less intensive, more pleasant skin feel on the other hand, the cutter system provides for two separate rows of cooperating teeth which are different from each other in terms of shape and/or size and/or positioning of the thickened and/or rounded tooth tips of the teeth. Thus, using a first row of cooperating cutting teeth may provide for a more aggressive, closer cutting action, whereas using a second row of cutting teeth may provide for a less intensive, more pleasant skin feel. The configuration of the tooth tips, in particular the configuration of the curvature and thickening thereof may considerably influence the cutting performance and allow the user to choose between closeness, thoroughness, soft skin feel and efficiency.

More particularly, the rows of cooperating teeth may differ from each other in terms of the height of the tooth tips which is, at least in part, defined by the position of the thickening relative to the main portion of the teeth and the size and shape thereof. At one row, the thickening may protrude only to the side opposite to the skin contact surface what may be achieved, for example, by bending or curving the teeth portions at which the tip thickenings are attached, away from the skin contact surface and/or attaching the thickening to the main portion of the teeth in an eccentric way, in particular a bit offset away from the skin contact surface. On the other hand, at a second row of cooperating teeth, the thickenings at the tooth tips may protrude to both sides of the teeth, i.e. to the skin contact surface and to the side opposite thereto.

In a more general way, the asymmetric design of the cutting teeth rows may be achieved in that the overhanging tooth tips at one row of cutting teeth protrude from the skin contact surface of a main portion of the cutting teeth towards the skin to be contacted further than the overhanging tooth tips at the other row of cutting teeth. In addition or in the alternative, the overhanging tooth tips at said other row of cutting teeth may be positioned further away from the skin contact surface of the main portion of the cutting teeth than the overhanging tooth tips of said one row of cutting teeth.

So as to achieve a sort of protection against piercing of the tooth tips of the lower comb-like cutting element or undercutter, the upper cutting element may have tooth tips overhanging the tooth tips of the lower cutting element and protruding towards a plane in which the teeth of the lower cutting element are positioned so that the thickened tooth tips of the upper cutting element form a sort of barrier preventing the tooth tips of the lower cutting element to pierce into the skin. More particularly, the overhanging tooth tips of the upper cutting element may be thickened and/or curved such that said overhanging tooth tips extend into and/or beyond said plane in which the tooth tips of the other cutting element are positioned. Thus, said tooth tips of the other cutting element are hidden behind the overhanging tooth tips of the other cutting element when viewing onto the tips of the teeth of the cutting elements in a direction substantially parallel to the longitudinal axis of the protruding teeth.

Said asymmetric rows of cooperating teeth may differ in the heights of the teeth having the overhanging thickened and/or curved tooth tips. The height of the teeth may be measured substantially perpendicular to the skin contact surface of the main portion of the teeth and/or perpendicular to a longitudinal axis of the teeth, and may include the contour of the thickening at the tips and the upper and/or lower contour of the main portion of the teeth. When the thickening protrudes away from the skin contact surface and/or the teeth are curved away from said skin contact surface, the height may span from the lowest point of the thickening to the upper surface of the main portion of the teeth defining the skin contact surface thereof.

Such heights may differ from row to row. More particularly, at one row the height of the cutting teeth having the overhanging tooth tips may range from 300 to 600 μm or 350 to 550 μm, whereas the height at the other row may range from 200 to 500 μm or 250 to 450 μm.

More generally, heights between 200 and 550 μm may eliminate the risk of penetration when the cutting system is applied in parallel to the skin, i.e. with the skin contact surface of the main portion of the teeth touching the skin or parallel to the skin to be shaved.

The aforementioned thickenings may be shaped spherical or at least similar to a sphere such as drop-shape or pearl-shape, wherein a diameter—in case of a drop-shape or pearl-shape a minimum diameter—may range from 250 to 600 μm or 300 to 550 μm or 350 to 450 μm.

To give the rows of cooperating teeth asymmetrical configuration, the thickenings of the overhanging tooth tips at one row may have a diameter ranging from 350 to 550 μm, whereas the diameter of the thickenings of the tooth tips at another row may range from 200 to 450 μm.

Figure 1B:
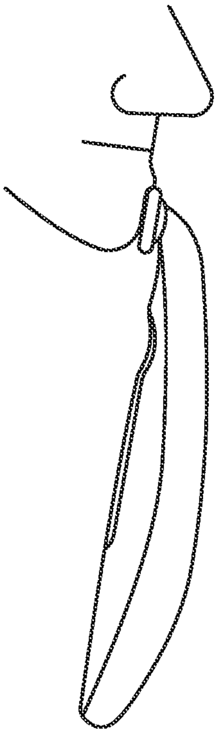

As can be seen from FIG. 1, the cutter system 3 may be part of a cutter head 2 which may be attached to a handle 100 of a shaver and/or trimmer 1. More particularly, the shaver and/or trimmer 1 may include an elongated handle 100 accommodating the electronic and/or electric components 49 such as a control unit 50, an electric drive motor 51 or a magnetic drive motor and a drive train 52 for transmitting the driving action of the motor to the cutter system at the cutter head 2 which cutter head 2 may be positioned at one end of the elongated handle 100, cf. FIGS. 1 and 2.

The cutter system 3 including a pair of cooperating cutting elements 4 and 5 may be the only cutter system of the cutter head 2 as it is the case with the example shown in FIG. 1. On the other hand, the cutter system 3 may be incorporated into a shaver head 2 having other cutter systems such as shear foil cutters, wherein, for example, the cutter system 3 having at least one row of cooperating cutting teeth 6, 7 may be positioned between a pair of shear foil cutters and/or in front of a shear foil cutter.

Figure 3:
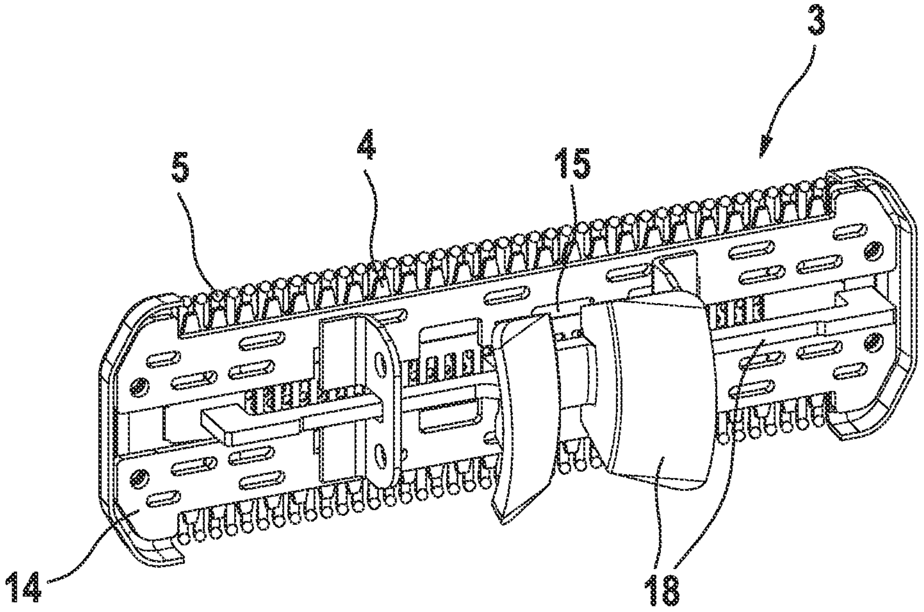
FIG. 3: a perspective view of the cutter system including the pair of cooperating comb-like cutting elements and the support structure for supporting the cutting elements relative to each other.
Figure 5B:
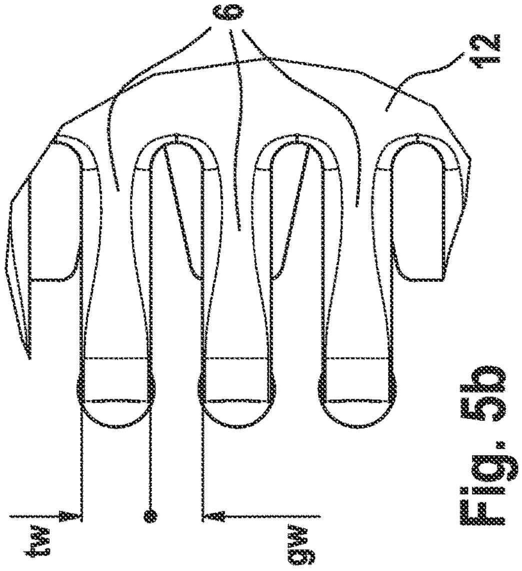
FIG. 5*a*-5*b*: a side view and a top view of the teeth of the upper cutting element having rounded and thickened tooth tips, wherein view (a) shows a side view of the rounding and thickening, whereas view (b) shows a top view of a pair of teeth with a gap there between, FIG. 6: a cross sectional view of a cutter system similar to FIG. 4, wherein the tooth tips of both rows of cooperating teeth on opposite sides of the cutter head are bent away from the skin contact surface and protrude only to the side opposite to the skin contact surface.
Figure 18:
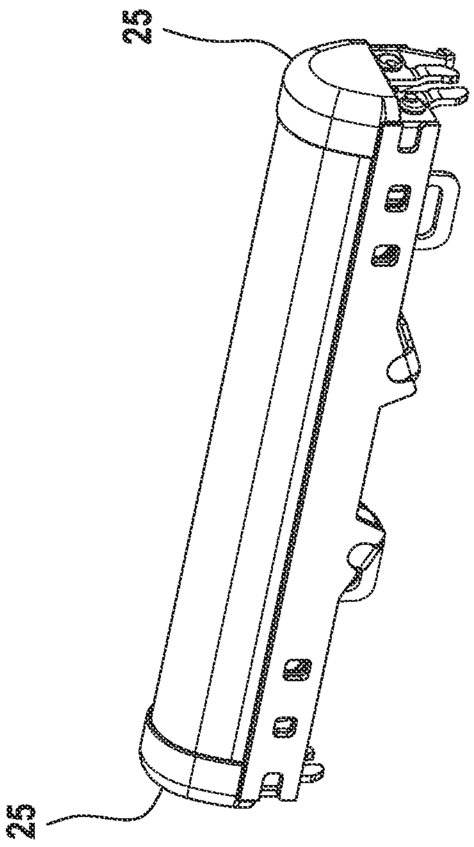
FIG. 18: lateral protection elements similar to FIGS. 14 and 17 applied to a cutter system in terms of a shear foil cutter.

Said cooperating cutting elements 4 and 5 may form comb-like cutting elements with at least one row 10, 11 of cutting teeth 6, 7, cf. FIGS. 1, 3 and 5. However, said cutting elements 4 and 5 also may be formed as a shear foil and a block-like cutter element cooperating therewith, as it is shown by FIG. 18.

As shown by FIG. 1, the cutter system 3 may include elongated rows of cutting teeth 6 and 7 which form toothed cutting edges and may reciprocate relative to each other along a linear path so as to effect the cutting action by closing the gaps between the teeth and passing over each other.

Figure 2:
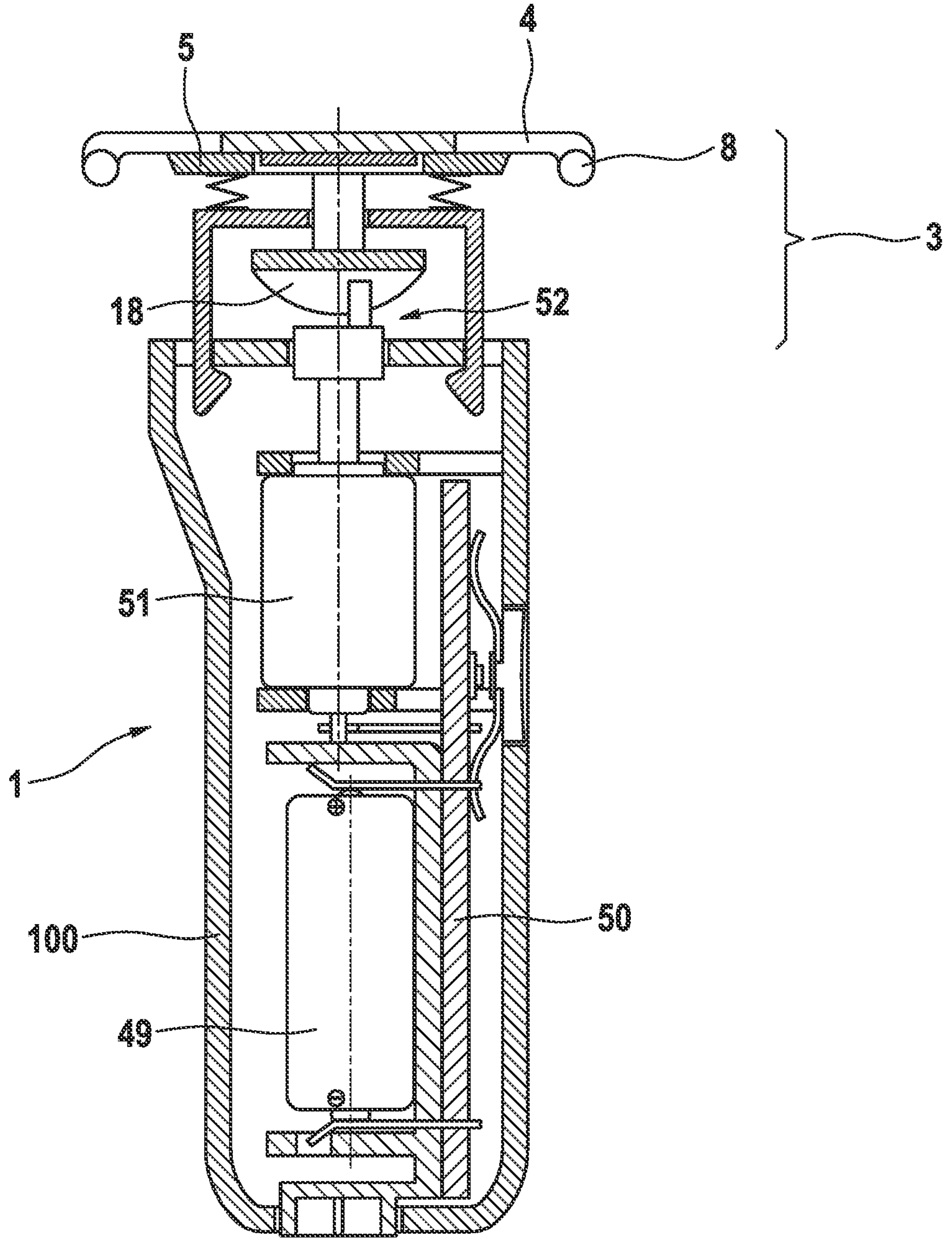
FIG. 2: a cross sectional view of the beard trimmer showing the cooperating comb-like cutting elements and the drive system for driving said cutting elements.

As shown by FIG. 2, the drive system may include a motor the shaft of which may rotate an eccentric drive pin which is received between the channel-like contours of a driver 18 which is connected to one of the cutting elements 4 which is caused to reciprocate due to the engagement of the rotating eccentric drive pin with the contours of said driver 18.

Figure 8A:
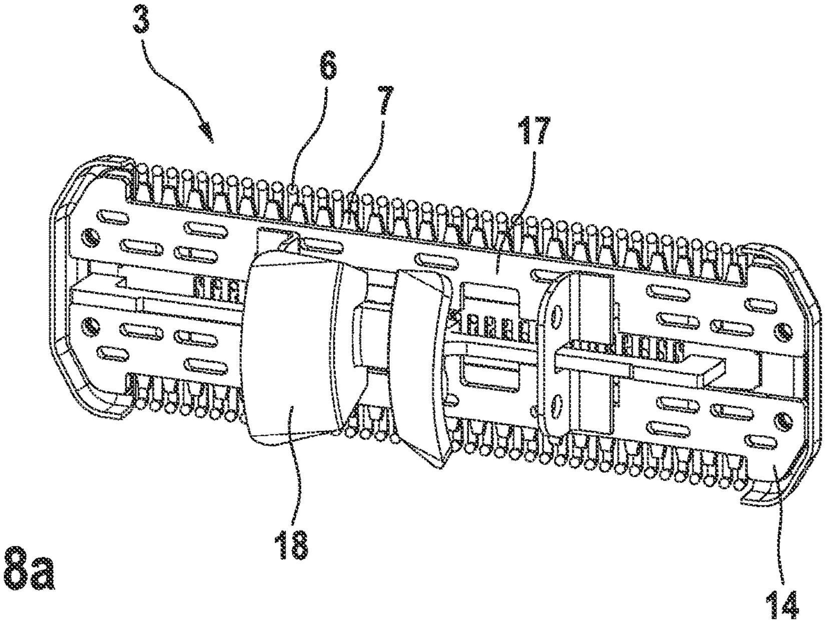
FIG. 8*a*-8*d*: shows the cutter system including the cooperating cutting elements in differently assembled/exploded views, wherein view (a) shows the assembled cutting system in a perspective view, view (b) shows an exploded view of the cutter system illustrating the spacer between the support element and the upper cutting element to define a gap for receiving the sandwiched cutting element, view (c) shows a partly exploded view of the cutting system with the spacer being attached to the support element, and view (d) shows a partly exploded view showing the sandwiched cutting element assembled with the spacer.
Figure 8B:
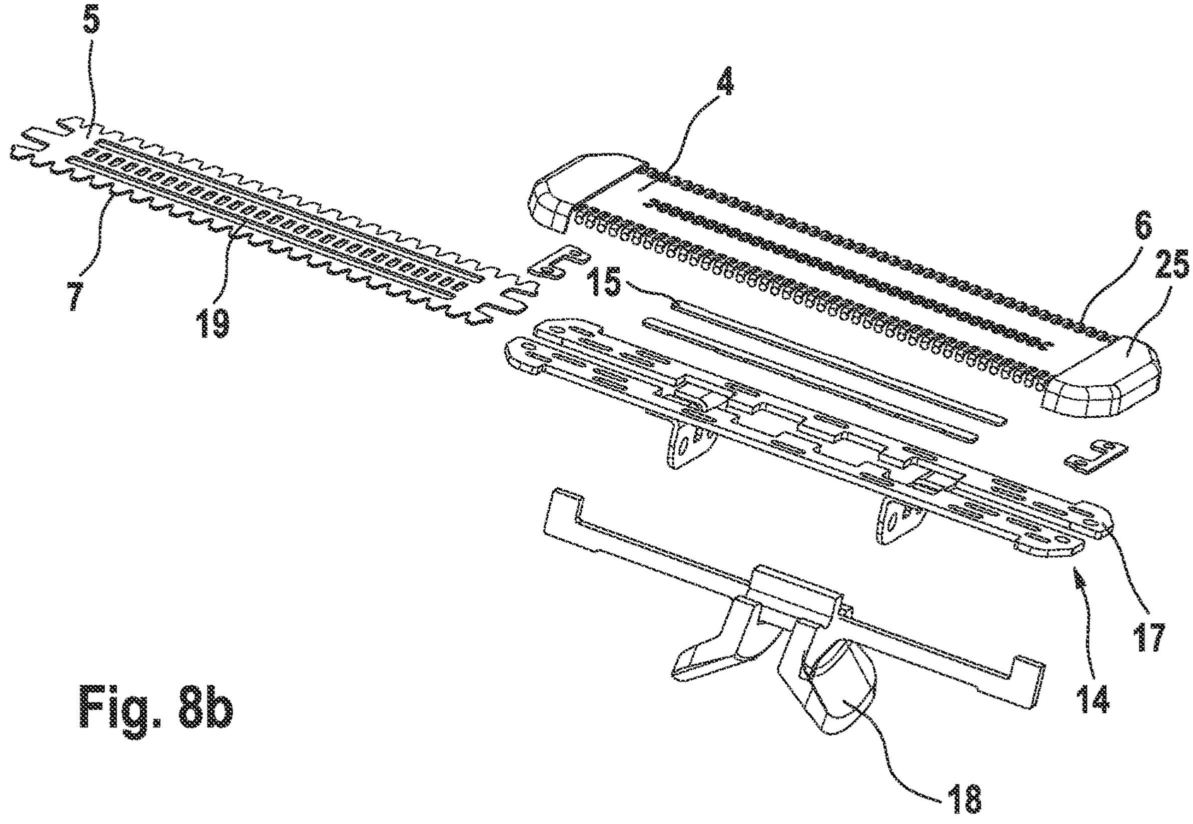
Figure 10A:
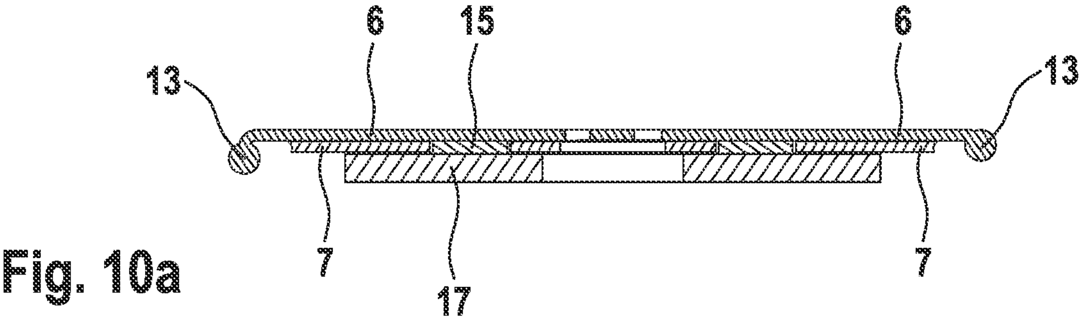
FIG. 10*a*-10*c*: a cross sectional view of the support structure including a spacer for defining a gap receiving the sandwiched cutting element which gap is slightly thicker than the sandwiched cutting element, wherein partial view (a) shows the entire cross-section of the support structure, partial view (b) shows one half of the support structure in enlarged view and partial view (c) shows the detail marked by the circle in partial view (b)
Figure 10B:
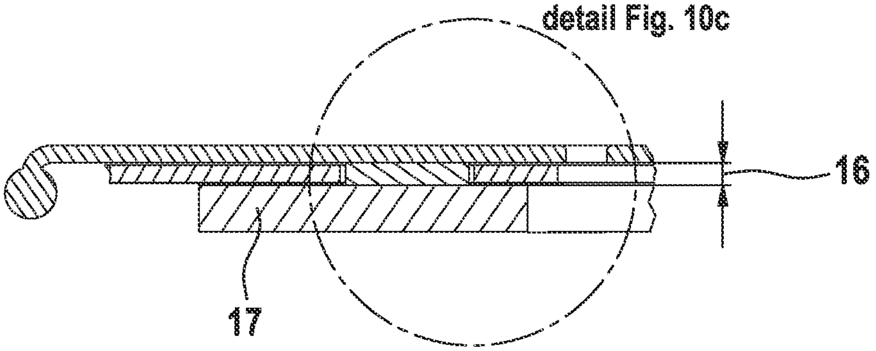
Figure 10C:
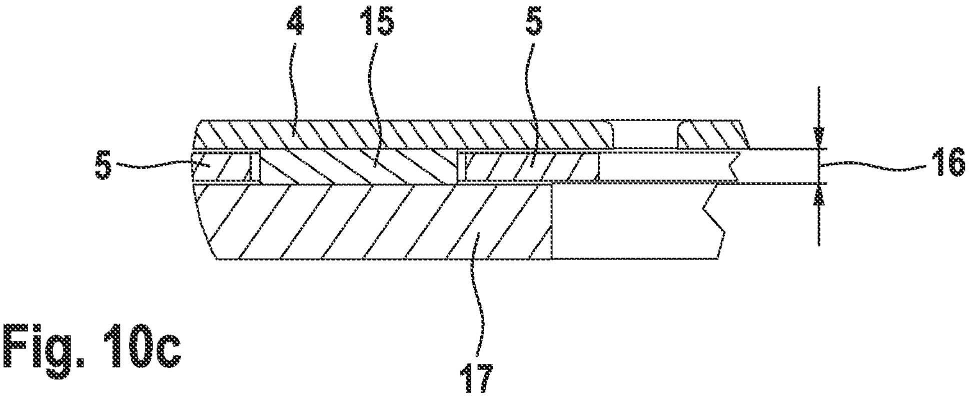

As shown by FIGS. 3, 8 and 10, the cooperating cutting elements 4 and 5 basically may have—at least roughly—a plate-shaped configuration, wherein each cutting element 4 and 5 includes two rows of cutting teeth 6 and 7 which may arranged at opposite longitudinal sides of the plate-like cutting elements 4 and 5, cf. FIG. 8*b* and FIG. 10*a*. The cutting elements 4 and 5 are supported and positioned with their flat sides lying onto one another. More particularly, the cutting teeth 6 and 7 of the cutting elements 4 and 5 touch each other back to back like the blades of a scissor.

So as to support the cutting elements 4 and 5 in said position relative to each other, but still allowing reciprocating movement of the teeth relative to each other, the cutting element 5 is sandwiched between the other cutting element 4 and a support structure 14 which may include a frame-like or plate-like support element 17 which may be rigidly connected to the upper or outer cutting element 4 to define a gap 16 therebetween in which gap 16 the sandwiched cutting element 5 is movably received.

Figure 8C:
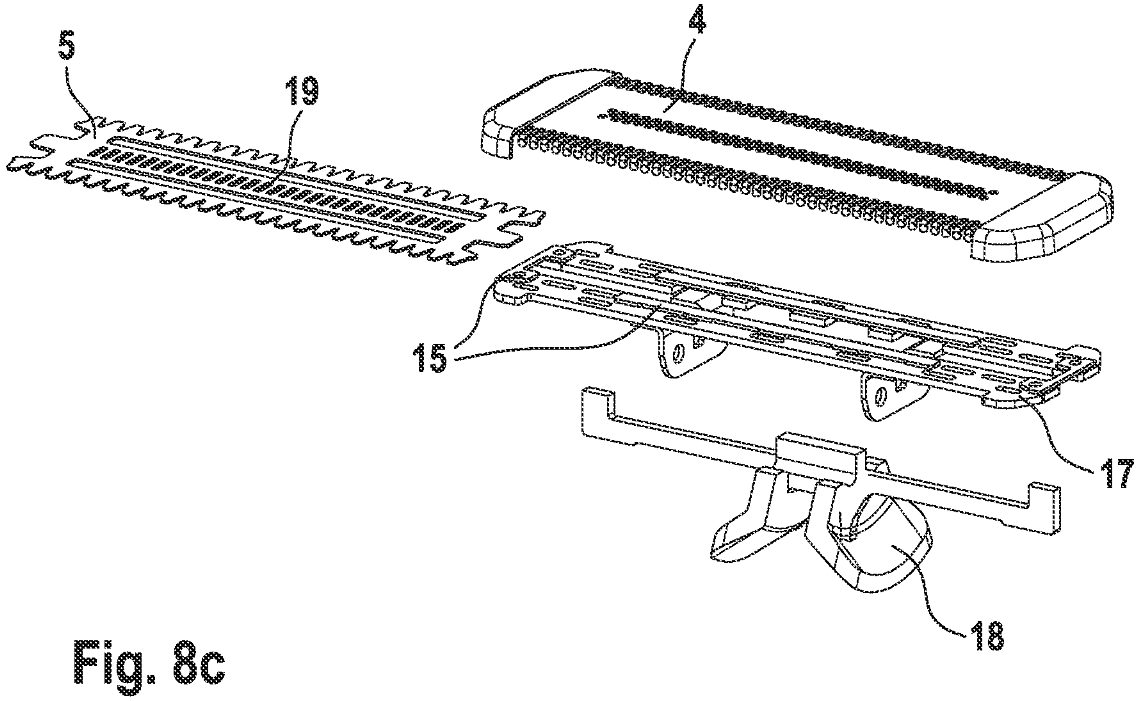
Figure 8D:
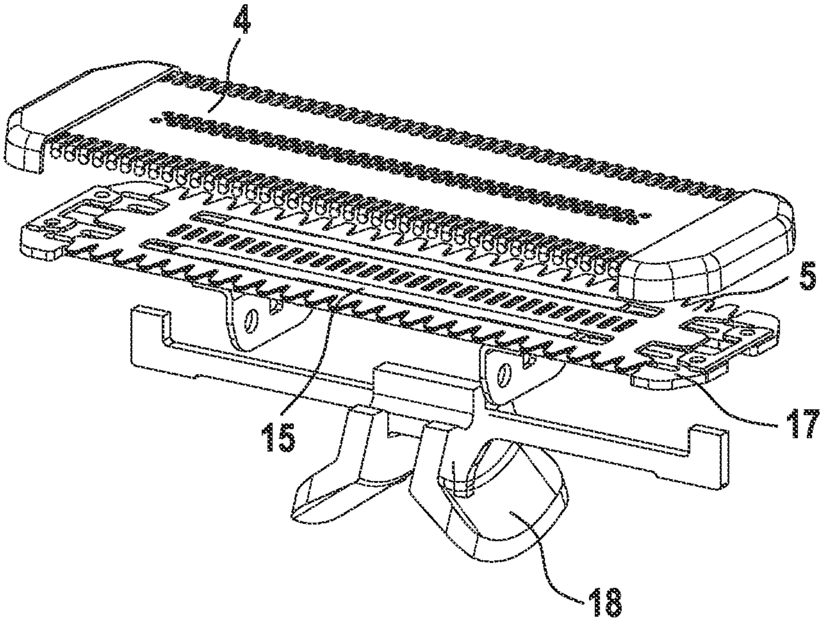

As can be seen from FIGS. 8*b*, 8*c* and 8*d*, a spacer 15 may be accommodated between the support element 17 and the upper cutting element 4 so as to precisely define the width or thickness of said gap 16. Said spacer 15 may be plate-shaped to precisely adjust the distance between the support element 17 and the cutting element 4.

More particularly, said spacer 15 may be located in the center of gap 16 so that, on the one hand, gap 16 is ring-shaped and/or surrounds said spacer 15 and, on the other hand, the distance between the cutting element 4 and the support element 17 is controlled at all sides due to the central location of said spacer 15.

The sandwiched cutting element 5 may include a recess 19 which may be formed as a throughhole going from one side to the other side of the cutting element 5 and in which said spacer 15 may be received. The contour, in particular the inner circumferential contour and/or the edges of said recess 19 may be adapted to the outer contour of the spacer 15 so that the cutting element 5 is guided along the spacer 15 when reciprocating. More particularly, the width of the spacer 15 may substantially correspond to the width of the recess 19 so that the cutting element 5 may slide along the longitudinal side edges of the spacer 15. The longitudinal axis of the elongated spacer 15 is coaxial with the reciprocating axis of the cutting element 5, cf. FIG. 8*d*.

The support element 17 which may be plate-shaped or formed as a frame extending in a plane, has a size and contour basically comparable to the cutting element 5 to be supported as can be seen from FIG. 8*b*, the support element 17 may have a substantially rectangular, plate-like shape supporting the cutting element 5 along lines or strips along the two rows 10 and 11 of cutting teeth 7, whereas the support element 17 may have a size and contour and/or configuration to support also at least a part of the teeth 7 of cutting element 5. In the alternative, the support element 17 may extend at least to the root of the teeth 7.

Figure 9B:
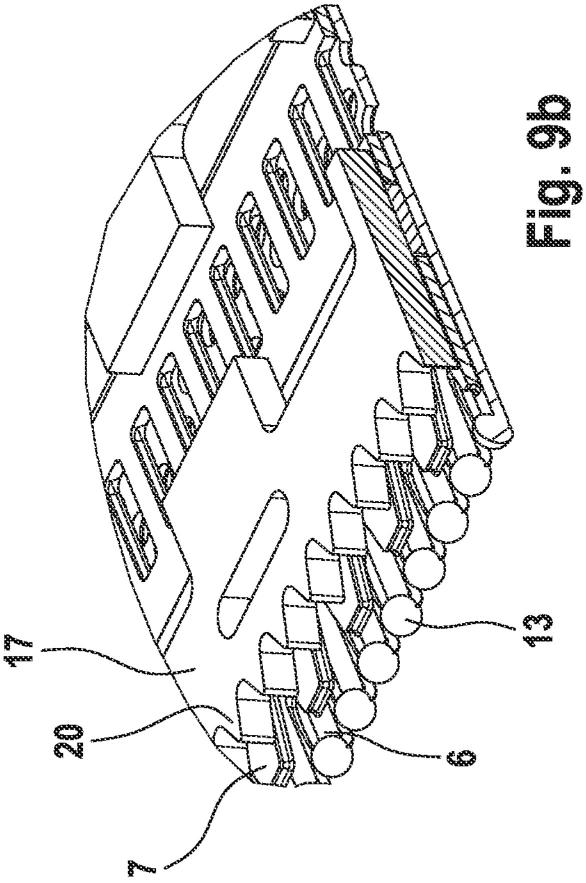
FIG. 9*a*-9*c*: shows perspective views (left side teeth 9*a* teeth 9*b*) and 9*c* and right side) in part of the cooperating cutting teeth to illustrate the rounded, thickened tooth tips of the upper cutting element overhanging the cutting teeth of the sandwiched cutting element and to illustrate the support element holding the sandwiched cutting element closely at the upper cutting element, said support element having a wave- or teeth-shaped edge contour.
Figure 9C:
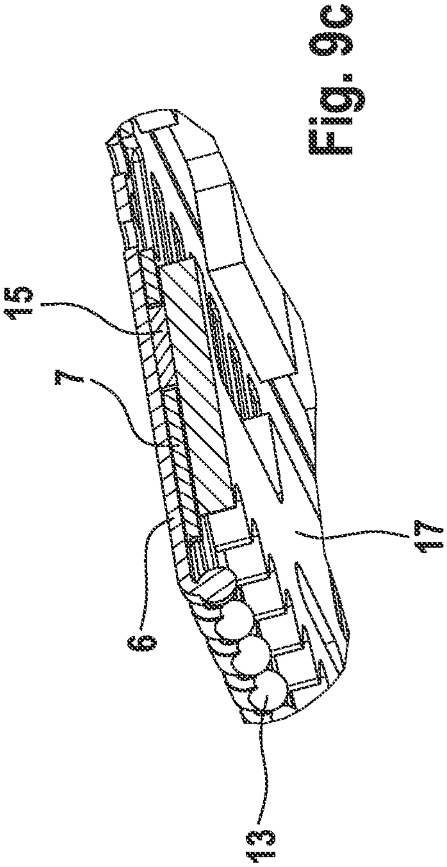
Figure 9A:
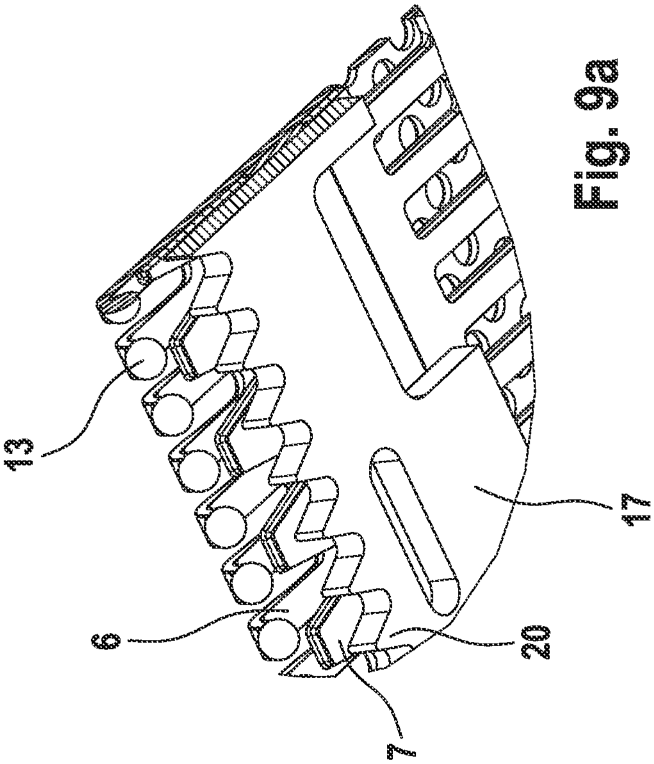

As can be seen from FIGS. 9*a* and 9*b*, the edge of the support element 17 extending along the row of teeth 7, may itself have a wave-shaped or teeth-like configuration with protrusions and gaps therebetween. The protrusions 20 extend towards the tips 9 of the teeth 7 at positions where they can support said teeth 7. Due to the toothed configuration of the edge of the support element 17 including the gaps between the protrusions 20, hairs may properly enter into the gaps between the cooperating teeth even when the cutter system is used as a rake. Nevertheless, the protrusions 20 provide for a better support of the teeth 7 against deflection.

The support element 17 is rigidly held at a predetermined distance from the cutting element 4 so that the gap 16 therebetween has precisely the desired thickness. This is achieved by the aforementioned spacer 15 the thickness of which exactly defines the thickness of gap 16.

So as to avoid undesired friction and heat generation, but nevertheless keep the teeth 6 and 7 sufficiently close to each other to achieve reliable cutting of hairs, said spacer 15 may have a thickness which is slightly larger than the thickness of the sandwiched cutting element 5, wherein the amount by which the thickness of the spacer 15 exceeds the thickness of the cutting element 5 is smaller than the diameter of usual hair. More particularly, the thickness of the spacer 15 may be larger than the thickness of the sandwiched cutting element 5 by an amount ranging from 20 to 40 μm.

The support element 17, the spacer 15 and the cutting element 4 may be rigidly connected to each other, for example by means of snap fitting contours to allow changing the cutting element 4. In the alternative, also unreleasable fastening is possible, such as welding or glueing.

For example, the cutting element 4 may be rigidly fixed at the support element 17 at opposite ends thereof, for example by means of holding end portions which may form, at the same time, lateral end protection elements 25 as described in detail below. Such fixation at end portions may be provided in addition or in the alternative to fixation via the spacer 15.

Figure 11A:
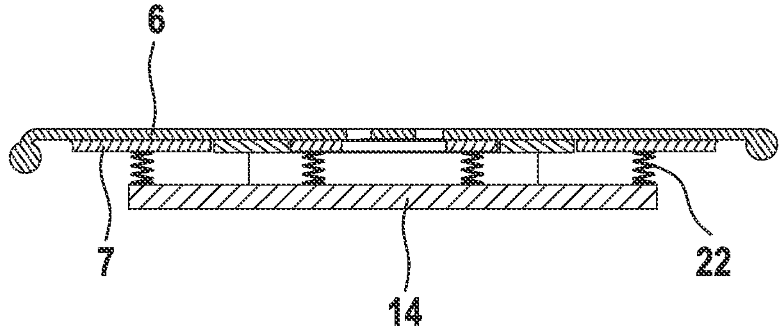
FIG. 11*a*-11*b*: a cross sectional view of an alternative support structure including a spring device urging the sandwiched cutting element towards the upper cutting element to minimize a gap between the cooperating teeth, wherein partial view (a) shows the entire cross-section and partial view (b) shows one half of the cross-section.
Figure 11B:
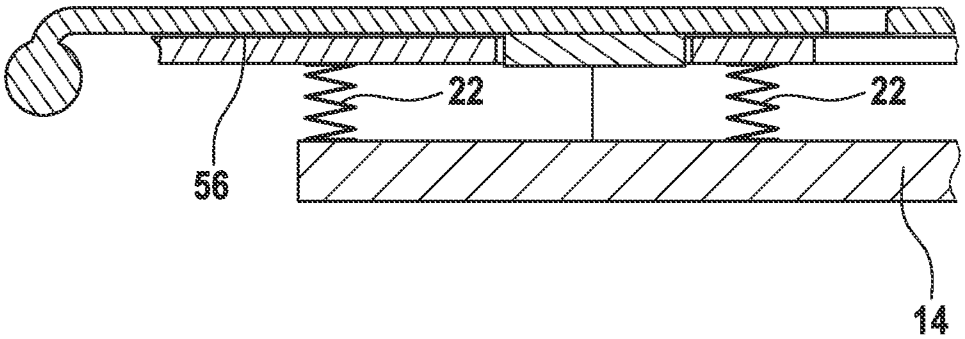

As can be seen from FIGS. 11*a* and 11*b*, the support structure 14 also may include a spring device 22 which may urge the cutting element 5 onto the cutting element 4 so as to avoid any gap 56 between the cooperating teeth 6 and 7. Such spring device 22 may be provided between the support structure 14 and the lower or under cutting element 5 so as to press the cutting element 5 onto the cutting element 4.

As can be seen from the figures, the cutting element 4 is provided with lateral ends 24 at opposite ends of the toothed cutting edges, wherein said lateral ends 24 substantially extend transverse to the longitudinal direction of the rows 10 and 11 of teeth 6, 7. Said lateral ends 24 may form the short, distal end sides of the cutter system, whereas the toothed cutting edges may form the long end sides of the cutter system.

As can be seen from FIG. 12, said lateral ends 24 of the cutting element 4 are provided with lateral protection elements 25 which have rounded and/or chamfered edge contours for a soft skin engagement and for preventing skin irritations caused by moving the lateral ends 24 along the skin.

As shown by FIG. 12, said lateral protection elements 25 may be integrally formed in one part with the cutting element 4 by end portions of the cutting element 4 bent away from the skin contact surface 12 and enveloping the gap 16 in which the sandwiched cutting element 5 is movably received and/or enveloping the support element 17 for supporting said other cutting element 5 movably relative to the stationary cutting element 4.

Figure 12A:
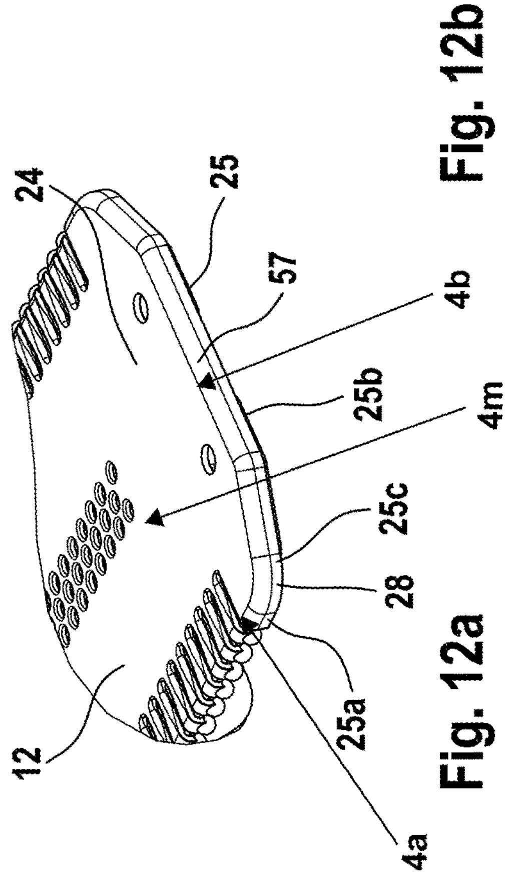
FIG. 12*a*-12*e*: a partial view of a cutting element having lateral end portions bent away from the skin contact surface and integrally forming the lateral protection element having rounded and/or chamfered contours for soft skin engagement, wherein partial views (a), (b) (c) and (d) show different perspectives and partial view (e) shows a cross-sectional view.
Figure 12B:
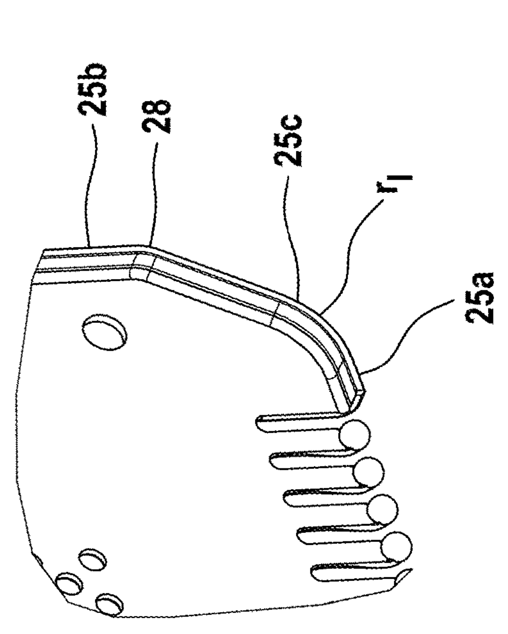
Figure 12C:
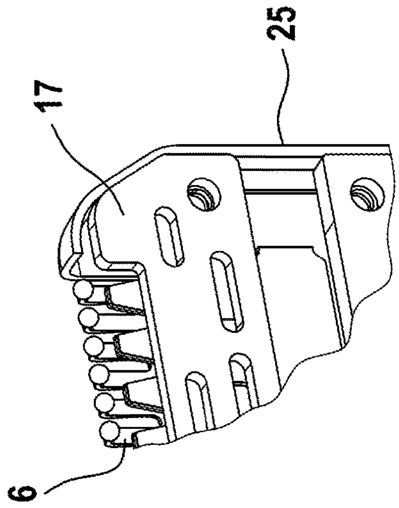

As shown by FIGS. 12*a* and 12*b*, said lateral protection element 25 has a U-shape with a pair of first protective portions 25 *a* extending at each of the two toothed cutting edges 10, 11 and extending generally parallel with a longitudinal edge 4*a* of the main portion 4*m* of the cutting element 4, a second protective portion 25 *b* extending along the lateral end 24 and extending generally parallel with a lateral edge 4*b* of the main portion 4*m* of the cutting element 4, and a rounded corner protective portion 25 *c* connecting said first and second protective portions 25 *a*, 25 *b*. All said first, second and corner portions 25 *a, b* and *c* together define a U-shaped flange 57 with softly rounded and/or chamfered contours bent or curved away from the skin contact surface 12.

Said bent lateral protection elements 25 may be formed from the same material and/or homogeneous with the cutting element 4 and the cutting teeth 6 thereof in one piece.

The lateral bending radius $r_1$ describing the bending and/or cornering of the corner portion 25*c* about a bending axis substantially perpendicular to the skin contact surface 12 may range from 500 to 1500 μm or 600 to 900 μm, cf. FIG. 12*b*.

Figure 12D:
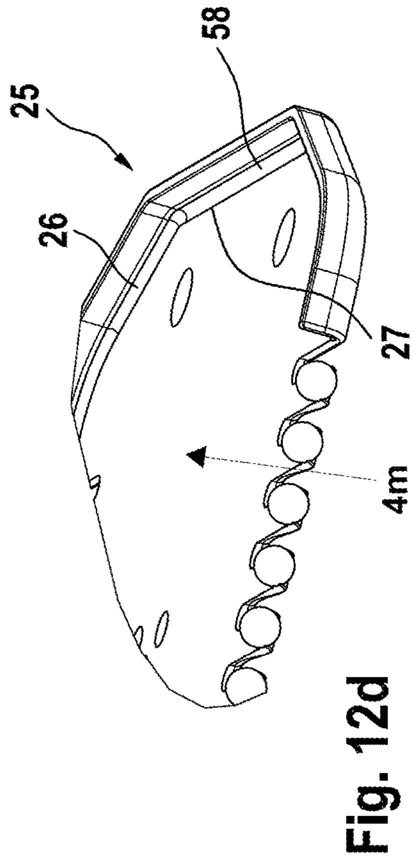
Figure 12E:
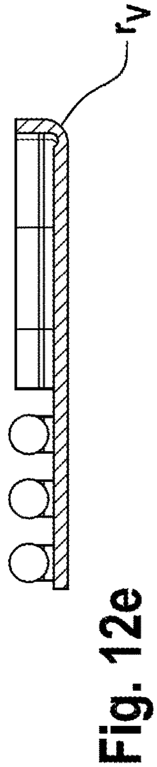

The bending radius $r_v$, as shown by FIG. 12*e*, may be larger than 400 μm or range from 400 to 1000 μm or 500 to 800 μm to allow for smooth, comfortable gliding along the skin.

As shown by FIG. 12*d*, bending may be facilitated by means of a groove-like notch 26 extending along the U-shaped contour of the lateral protection element 25 and formed in a seaming portion 27 connecting the flat main portion 4*m* of the cutting element 4 which forms the skin contact surface 12, with the bent portion 58 of the lateral protection element 25 weakening or thinning the seaming portion 27 prevents the bent portion 58 of the lateral protection element 25 from wrinkles or other undesired deformations when multiaxially bending the end portions of the cutting elements to form the lateral protection element 25.

Said notch 26 may be formed, for example, by embossing and/or electro-chemical methods like edging, ECM or PECM to remove material along the seaming portion 27.

In addition to or in the alternative to such notch 26, at least one slot 28 may be provided in the lateral end portion to be bent, in particular in the region which should form the corner portion 25*c*. More particularly, a substantially V-shaped cutout may be provided in such lateral end portions, wherein the edges of such V-shaped slot may approach each other when bending the end portions to close the cutout.

Such slot 28 may be filled with a filler material such as glue so as to provide for a smooth surface bridging such slot 28.

Another option of forming the lateral protection elements 25 is shown by FIG. 13. More particularly, each of the lateral protection elements 25 may be formed in part by the cutting element 4 and in part by the support element 17 which may protrude at least laterally beyond the cutting element 4 as it is shown by FIG. 13*c*.

Said cutting element 4 and the support element 17 together may define a rounded and/or chamfered protection contour which also may include a step-like contour portion. The edges of the lateral end 24 of the cutting element 4 and/or the edges of the support element 17 may be rounded and/or chamfered so as to together define a soft, rounded and/or chamfered contour for soft skin contact.

Figure 13B:
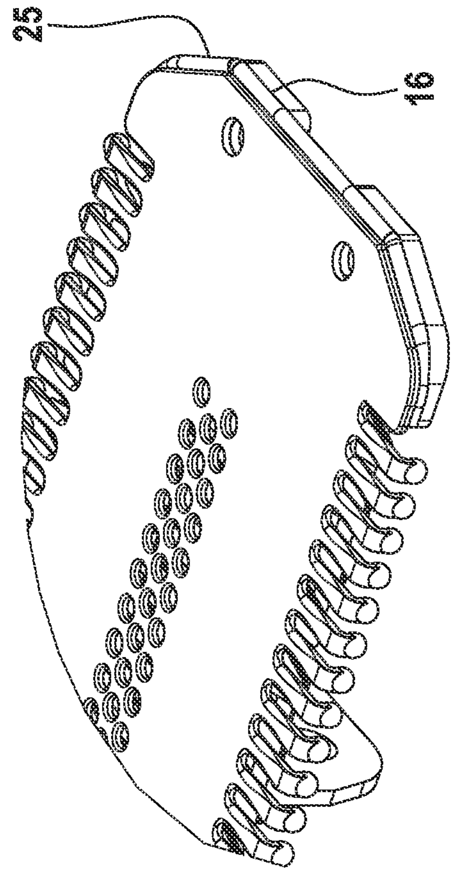
FIG. 13*a*-13*d*: a partial view of the cutting elements and a support element for movably supporting a sandwiched cutting element under a stationary cutting element, wherein the stationary cutting element and the support element together form lateral protection elements having rounded and/or chamfered contours for soft skin engagement, wherein partial views (a) and (b) show perspective views and partial views (c) and (d) are side views showing a filler material between the stationary cutting element and the support element.
Figure 13D:
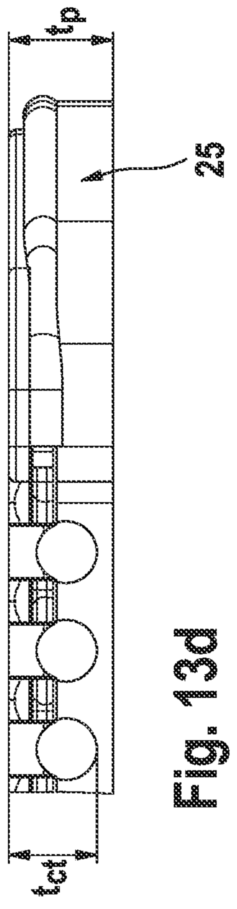
Figure 13A:
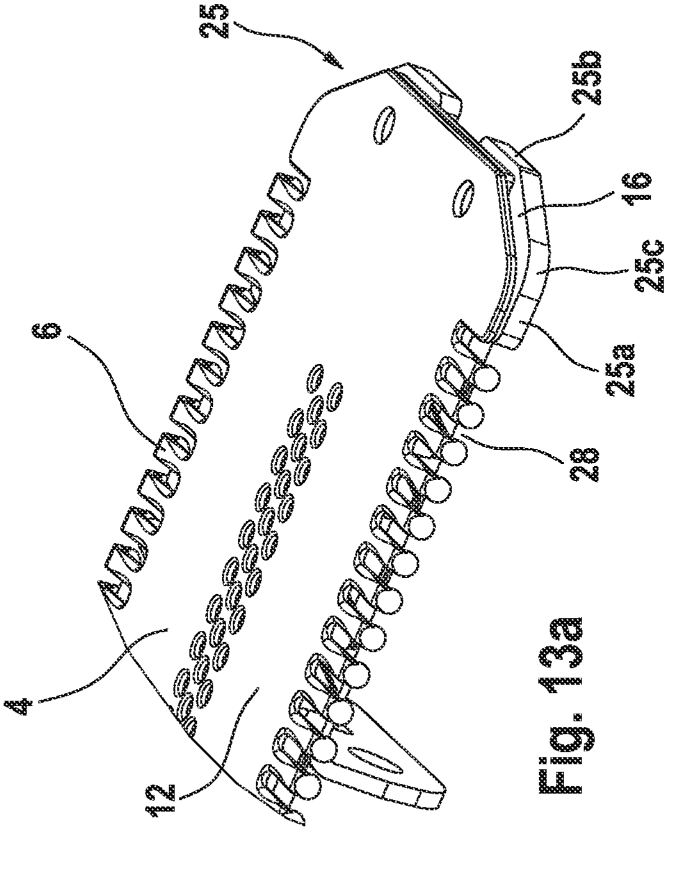
Figure 13C:
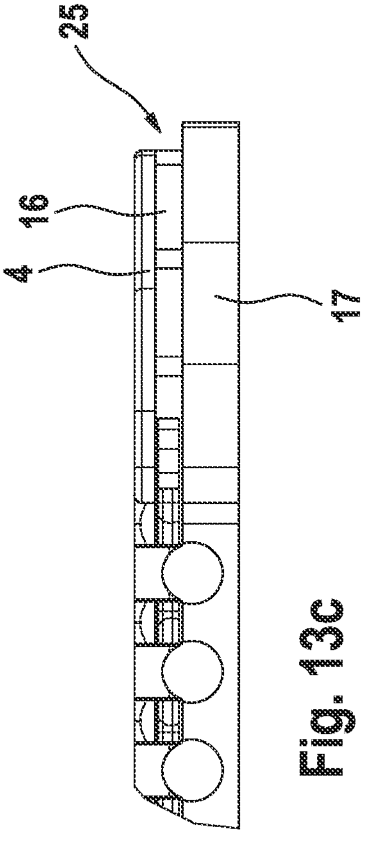

As shown by FIGS. 13*b* and 13*c*, the gap-like space 16 between the cutting element 4 and the support element 17 in which gap-like space 16 the other cutting element 5 is movably received, may be closed at the lateral end portions by means of filling said gap 16 with a filler material such as glue beads. Said filler closing the gap 16 also may form a part of the rounded and/or chamfered contour of the lateral protection element 25.

The aforementioned rounding of the corner portions 25*c* about an axis perpendicular to the skin contact surface and/or the provision of longitudinal protective portions 25*a* neighboring the toothed cutting edges also may be applied to the configuration of FIG. 13.

As can be seen from FIG. 13 (*c*), the filler material filling the gap-like space 16 may basically follow the lateral end contour of the cutter element 4 and/or may end at the edges of said cutter element 4 to form, together with the cutter element 4 and the support element 17, a step-like lateral side contour.

As can be seen from FIG. 13 (*d*), said filler material closing the gap-like space 16 may, however, also bridge the lateral edges of the cutter element 4 and the support element 17 and/or may have an outer edge which, when viewed in cross-section, has a sloped and/or curved contour so as to extend from the more inwardly positioned edge of the cutter element 4 to the more outwardly positioned edge of the support element 17. The filler material may smoothen the transition from the lateral edge of the cutter element 4 to the lateral edge of the support element 17 projecting beyond the cutter element.

Figure 14B:
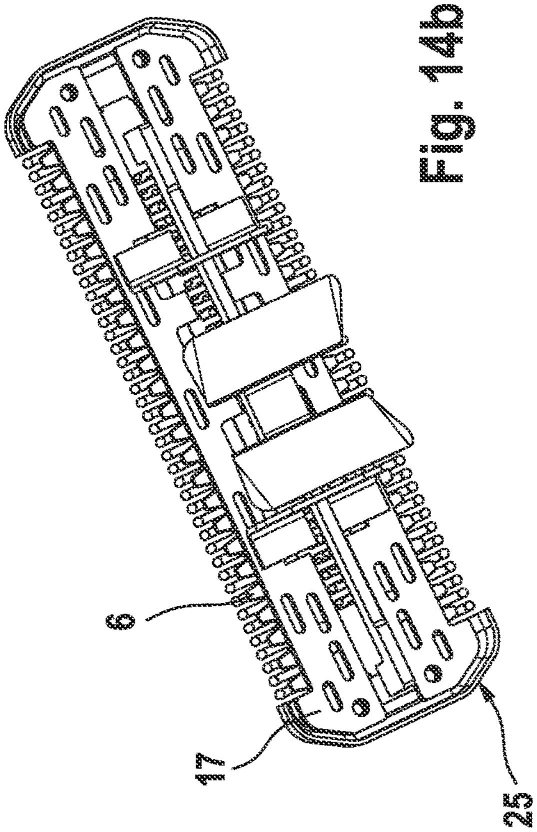
FIG. 14*a*-14*d*: shows a cutter system with a pair of cooperating cutting elements with separate lateral protection elements formed from thin metal sheet, wherein partial view (a) is a perspective view of the cutter system, partial view (b) shows the bottom side of the cutter system in part, partial view (c) is an enlarged perspective view of the lateral protection element formed from metal sheet and partial view (d) is a front view of the cutter system showing in part a toothed cutting edge and the lateral protection element.
Figure 14D:
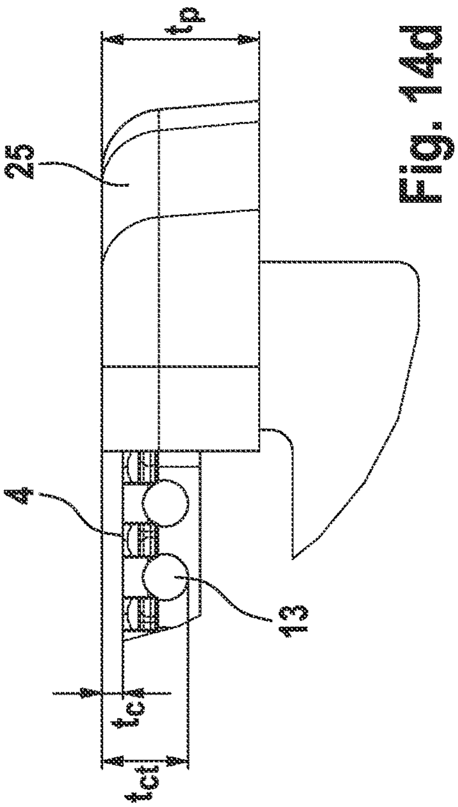
Figure 14A:
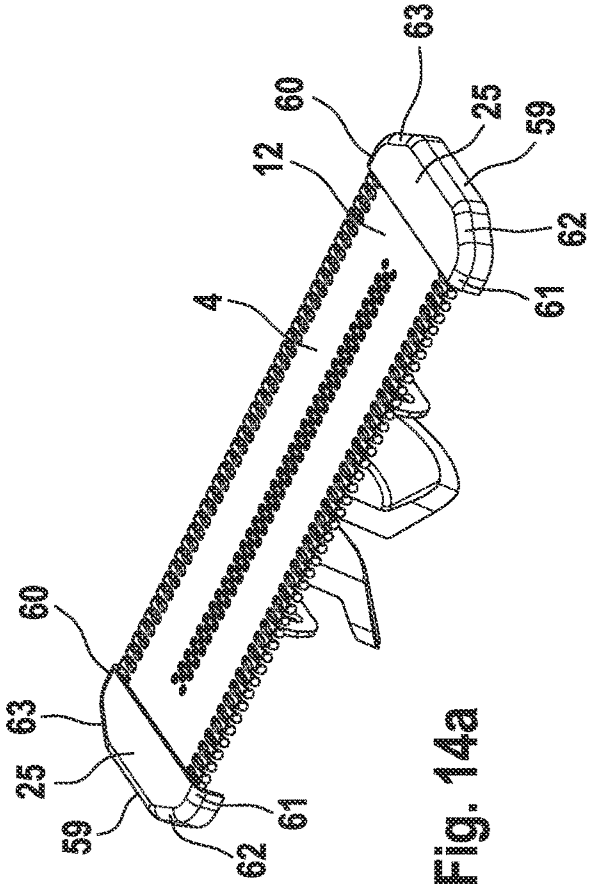
Figure 14C:
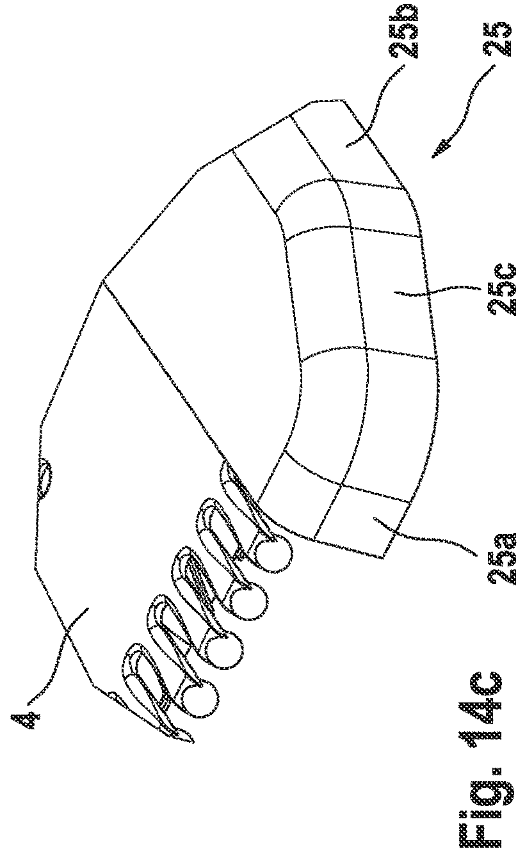

As shown by FIG. 14, the lateral protection elements 25 also may be formed separately from the cutting element 4 and may be rigidly attached thereto, wherein the lateral protection elements 25 can be made from a metal sheet having a sheet thickness of less than 200 μm, cf. FIG. 14*d*.

The lateral protection elements 25 made from metal sheet may include a top portion 25*d* which covers a part of the skin contact surface 12 of the lateral ends 24 of the cutting element 4. However, due to the very thin sheet metal having a thickness of less than 200 μm, there is significantly less protrusion towards the skin to be contacted as it would be the case when using molded plastic caps. In addition to such top portion 25*d*, the lateral protection elements 25 of FIG. 14 may include the first, second and corner portions bending away from the top portion and from the skin contact surface in a way similar as described for FIG. 12.

The lateral protection elements 25 of FIG. 14 may be attached to the cutting element 4 in different ways, for example by means of welding such as point welding due to the fact that both the lateral protection element 25 and the cutting element 4 are made from metal. In addition or in the alternative, the lateral protection element 25 may be glued and/or form-fitted and/or clamped to the cutting element 4 and/or attached by other fixation means.

As can be seen from FIG. 15, such metal sheet lateral protection element 25 also may have a ring-shape to envelop opposite sides of the package including the cutting element 4 and the support element 17. As can be seen from FIG. 15*a*, the lateral protection element 25 may not only cover the skin contact surface 12 of the cutting element 4, but also the bottom surface of the support element 17, thus extending around four sides of the aforementioned package.

Figure 15B:
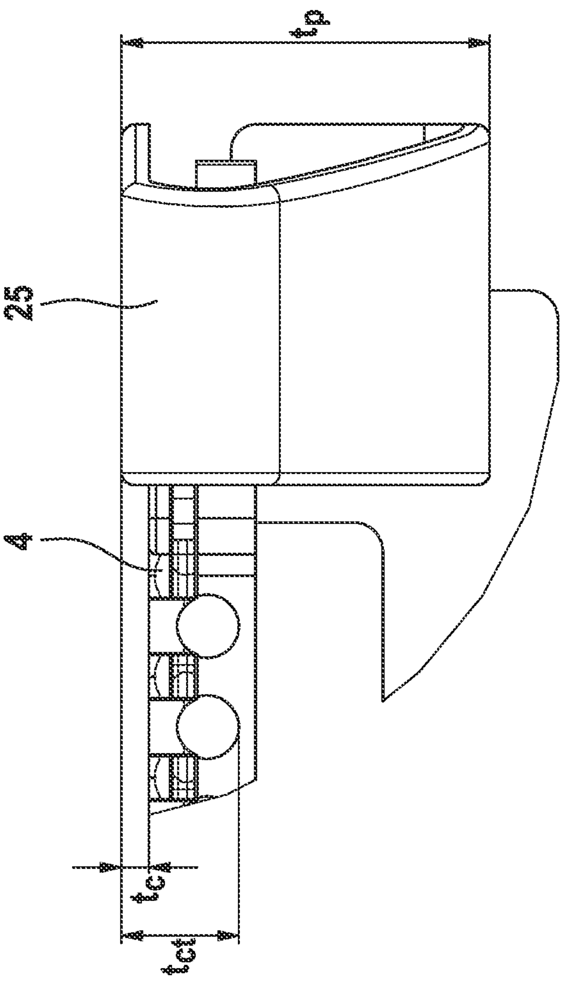
FIG. 15*a*-15*d*: a ring-shaped lateral protection element made from metal sheet and enveloping the lateral end portion of a cutter system, wherein partial view (a) shows a bottom side of a support element as enveloped by said lateral protection element and partial view (b) is a side view of the lateral protection element, and wherein partial view (c) shows the skin contact surface of the cutter system together with the lateral end caps and partial view (d) shows the support side of the cutter system with the lateral end caps.
Figure 15A:
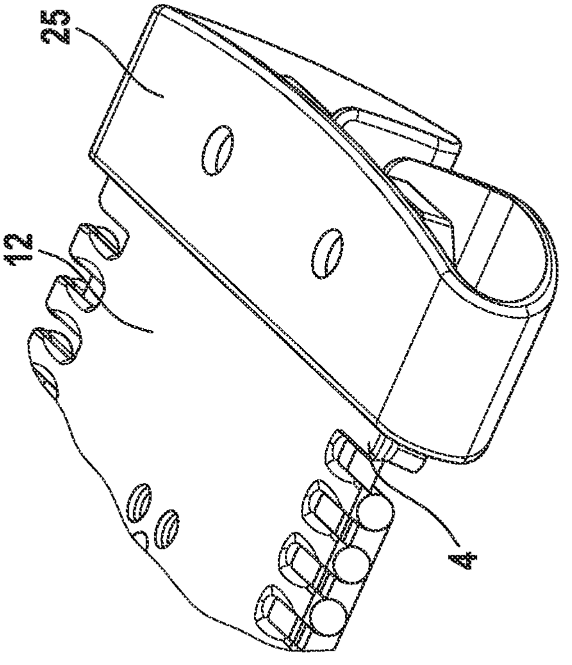
Figure 15D:
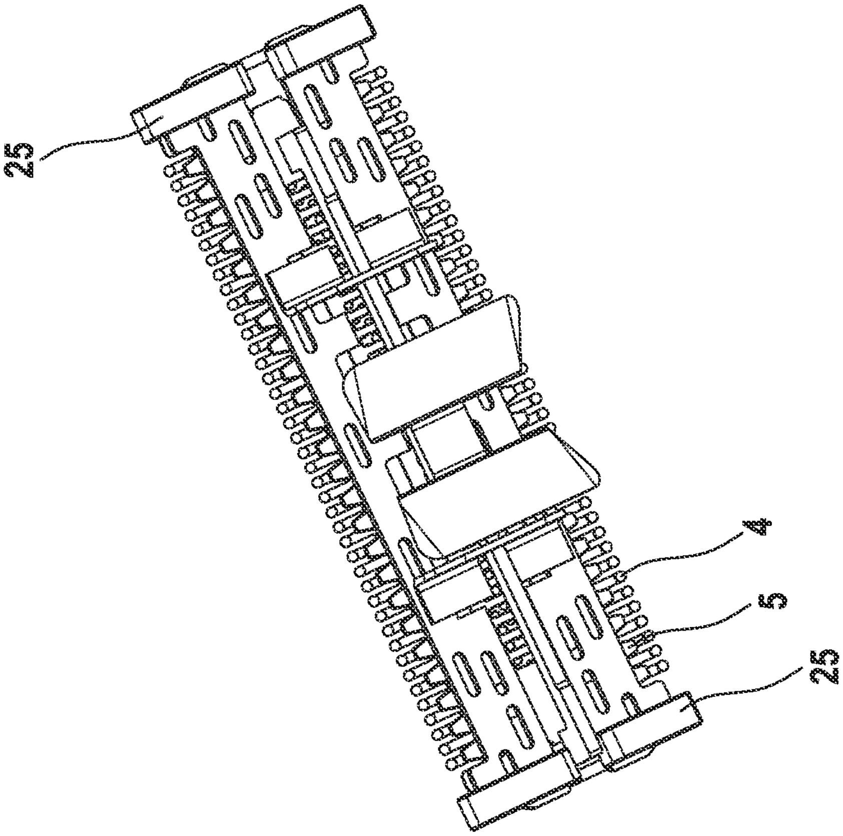
Figure 15C:
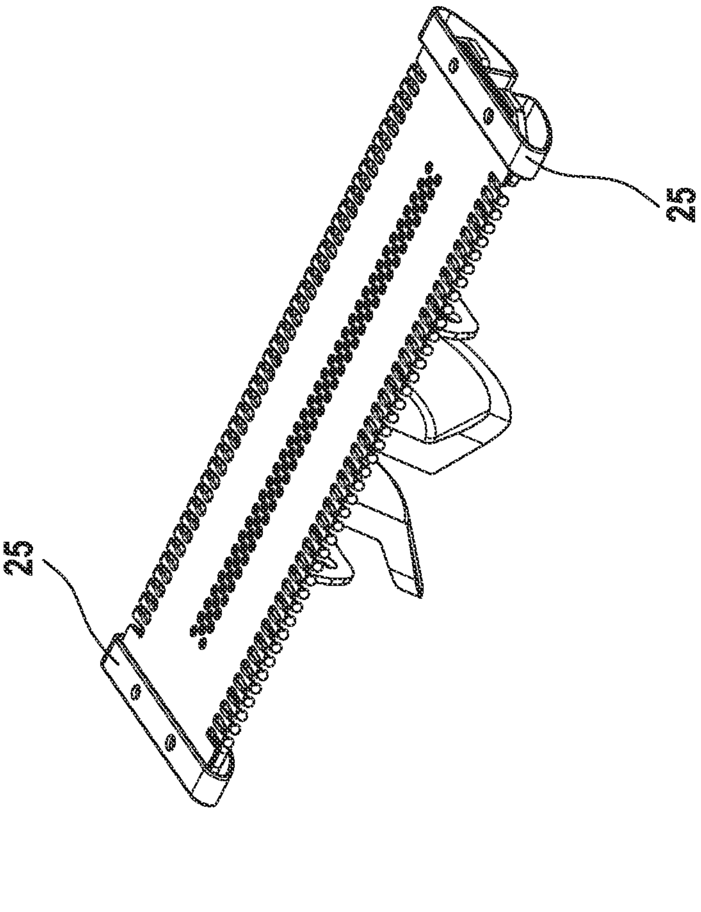

As can be seen from FIG. 15*a*, the lateral protection element 25 may be ring-shaped and/or may include two open sides one of which is facing the center of the cutting element 4 and the other is facing away from said center. Similar to a napkin ring, the lateral protection element may be slipped onto the lateral end 24 of the cutting element 4 and the lateral end of the supporting element 17.

Such ring-shaped lateral protection element 25 may be attached to the support element 17 and/or the cutting element 4 in various ways, for example by means of welding and/or gluing and/or formfitting and/or clamping and/or screwing.

Figure 16B:
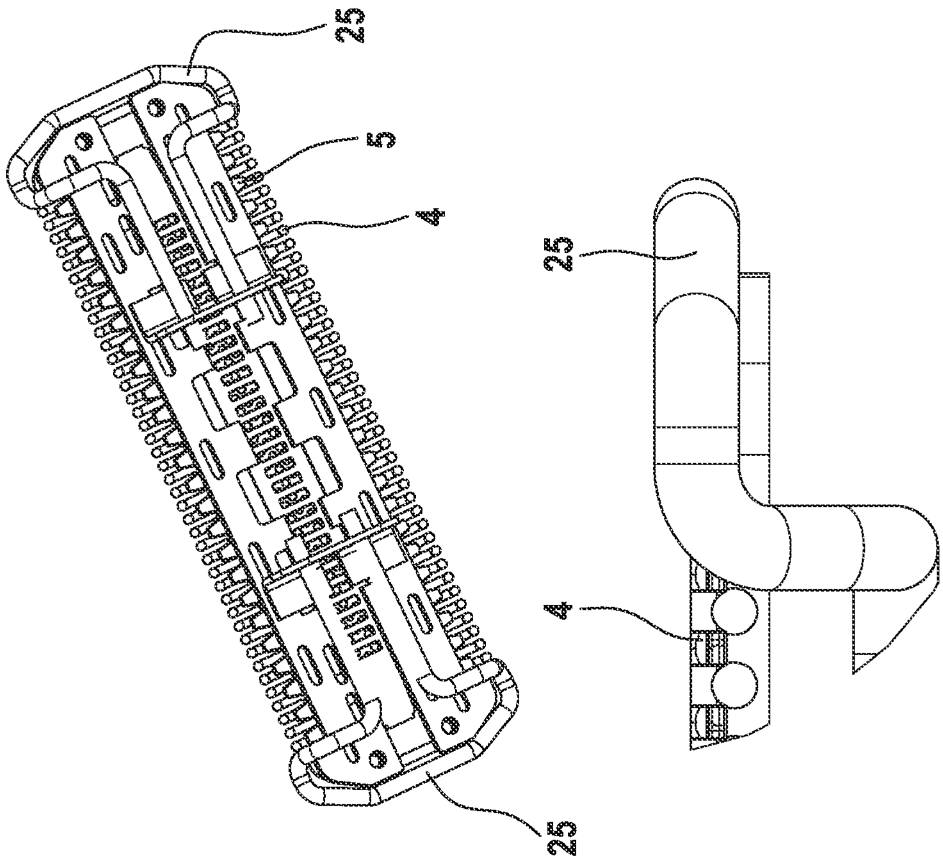
FIG. 16*a*-16*b*: another example of bumper-like lateral protection elements formed from a bent or curved rod-like or bar-like profile with upper view 16*a* as top view and lower view 16*a* as enlarged view thereof and upper view 16*b* of the underside and lower view 16*b* as enlarged side view thereof.
Figure 16A:
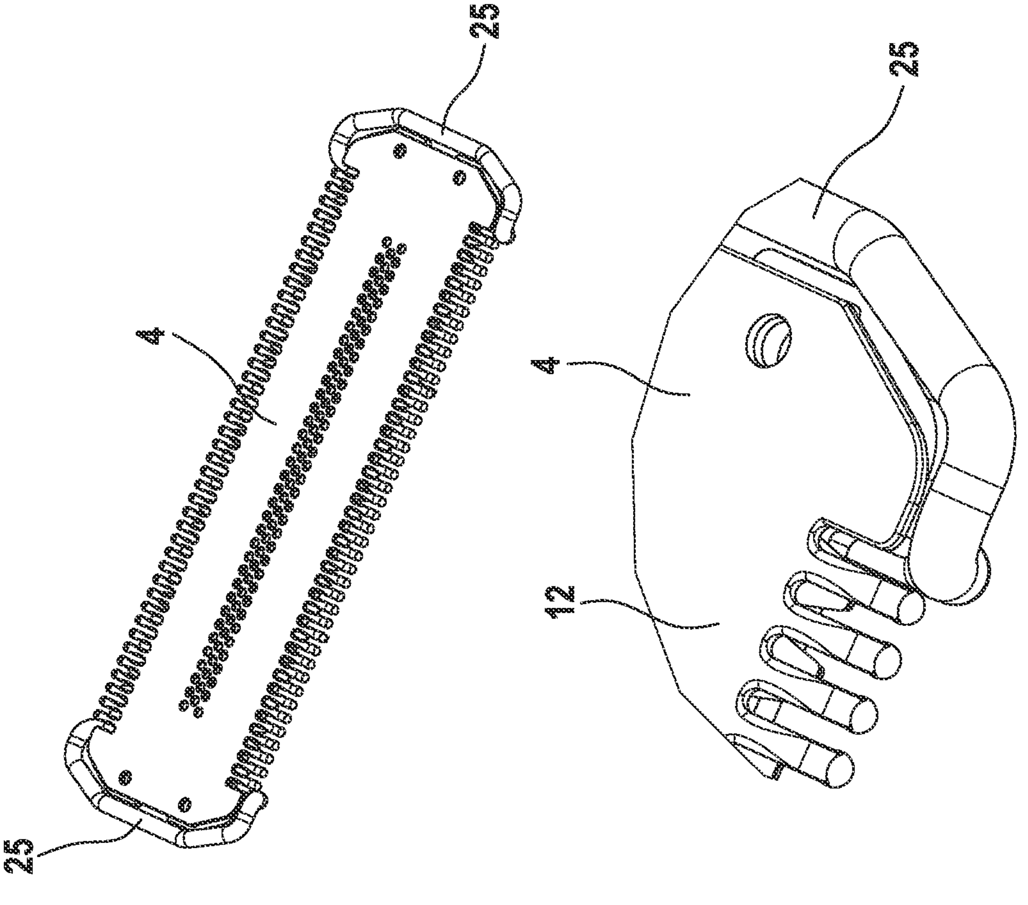

FIG. 16 shows another example of lateral protection elements 25 surrounding the lateral end portions of the cutter element 4. In the example of FIG. 15, said lateral protection elements 25 are formed as a sort of bumper from a rod-like or bar-like profile which extends around the lateral end portion of the cutter element 4 and/or around the lateral end portion of the support element 17. As can be seen from FIG. 14 (*b*), the bumper-like protection elements 25 may extend towards the bottom side of the cutter system and/or may be connected to the bottom side of the support element 17.

Figure 17:
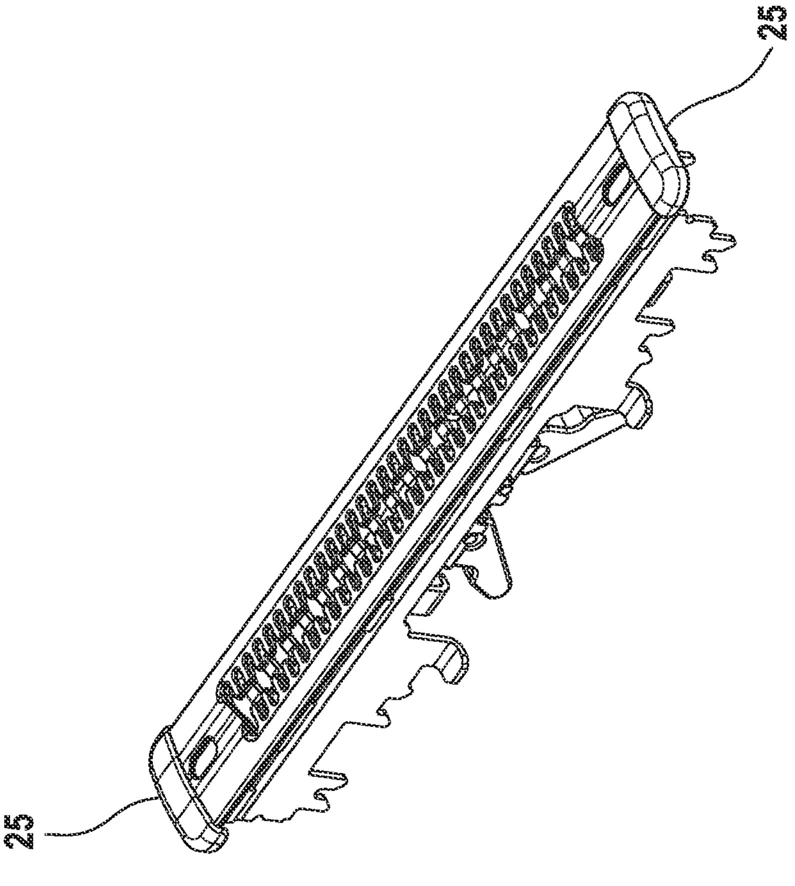
FIG. 17: lateral end protection elements similar to FIG. 14 as applied to another cutter system including a pair of center trimmers.

As can be seen from FIGS. 17 and 18, the aforementioned lateral protection elements 25 may be associated with different types of cutter systems. For example, as shown by FIG. 17, the lateral protection elements 25 may be used to protect the lateral end portions of a cutter system having a center trimmer which may include a pair of cooperating rows of teeth facing each other.

Furthermore, as shown by FIG. 18, the lateral protection elements 25 also may be used to protect the lateral end portions of a shear foil cutter.

All different examples of the aforementioned lateral protection elements 25 may be used for such different types of cutter systems.

To avoid skin irritations not only in the region of the lateral ends, but also at the toothed cutting edges during hair cutting, at least one cutting element 4 may have cutting teeth 6 with thickened and/or rounded tooth tips overhanging the teeth of the other cutting element. As can be seen from FIGS. 4, 5 and 6, the teeth 6 of the outer cutting element 4 overlap the cutting teeth 7 of the cooperating cutting element 5, wherein the tooth tips 8 of such overlapping teeth 6 may be provided with substantially spherical thickenings 13, cf. also FIG. 9 showing such thickenings 13.

In addition to such thickening 13 forming the outermost tooth tips of the teeth 6, said teeth 6 of the cutting element 4 may be provided with a bent portion **6*b* connecting said thickening 13 to a main tooth portion 6*m* which forms the cutting portion of the teeth as such main tooth portion 6*m* form the blades cooperating with the teeth 7 of the other cutting element 5** in terms of opening and closing the gap between the comb-like, protruding pairs of teeth and passing over each other to achieve shearing of hairs entering into the spaces between the protruding teeth.

Such bent portion **6*b* curves away from the skin contact surface 12 of the cutting teeth 6 of cutting element 4, wherein the bent radius R of such bent portion 6*b* may range from 200 to 400 μm, for example. The bending axis may extend parallel to the reciprocating axis and/or parallel to the longitudinal extension of the row 10, 11 at which the cooperating teeth 6, 7** are arranged.

As can be seen from FIG. **5*a*, the transition portion between the curved portion 6*b* and the thickening 13 may form a slight depression or a concave portion, as the thickening 13 may further protrude from the bent portion 6*m*** and may have a different radius of curvature r (which is a sphere radius when the thickening is spherically shaped).

Figure 5A:
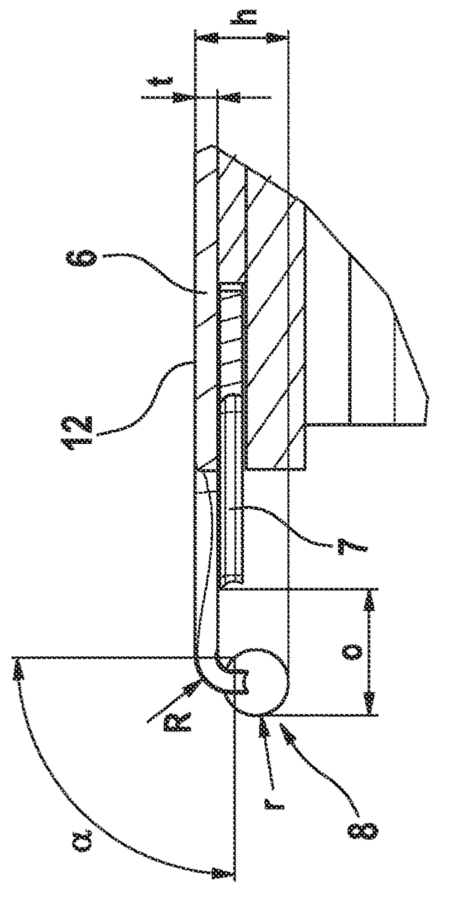

Said bent portion **6*b* may extend over a bent angle α ranging from 100 to 450 or 15° to 30° or 10° to 90° or 15° to 180°, cf. FIG. 5*a***.

The substantially spherical thickenings 13 at the tooth tips 8 may have a diameter ranging from 300 to 550 μm or 350 to 500 μm.

Figure 4A:
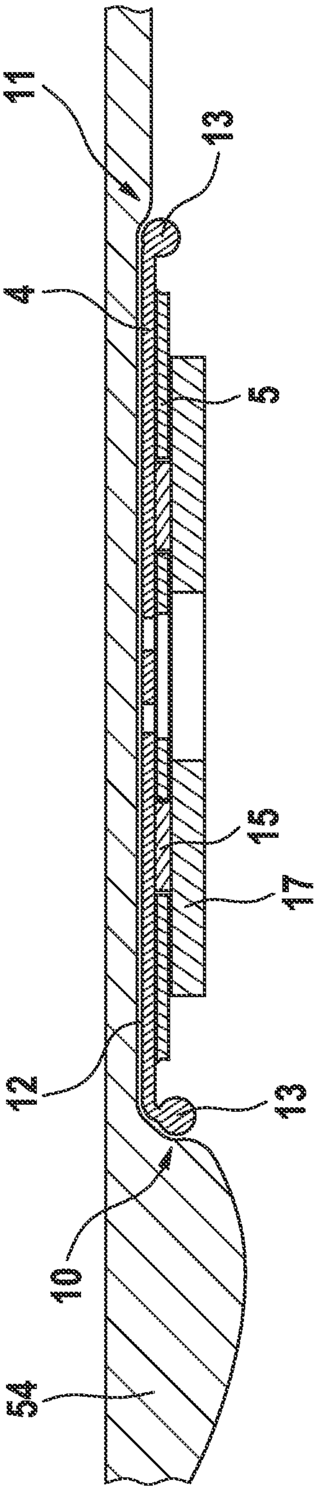
FIG. 4*a*-4*c*: a cross sectional view (c) of the cutter system in contact with the skin to be shaved, showing the asymmetric rows of cooperating cutting teeth on opposite sides of the cutter head and shaped differently from each other to achieve different skin contact and skin waves when moving the cutter system along the skin to be shaved, wherein partial, enlarged views of view 4 *c* for the right side row of teeth (a) and for the left side row of teeth (b) show the different configuration of the tooth tips of the two rows of cutting teeth.
Figure 4C:
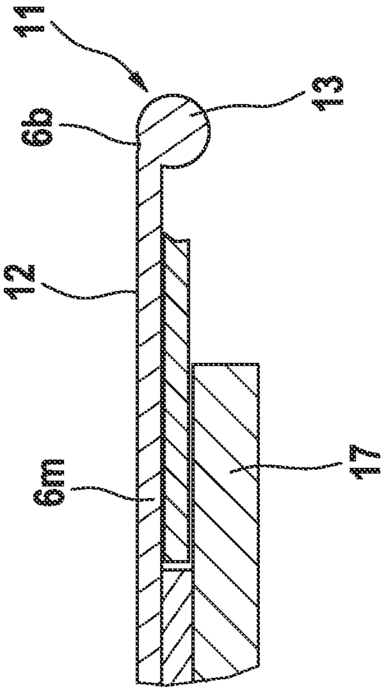
Figure 4B:
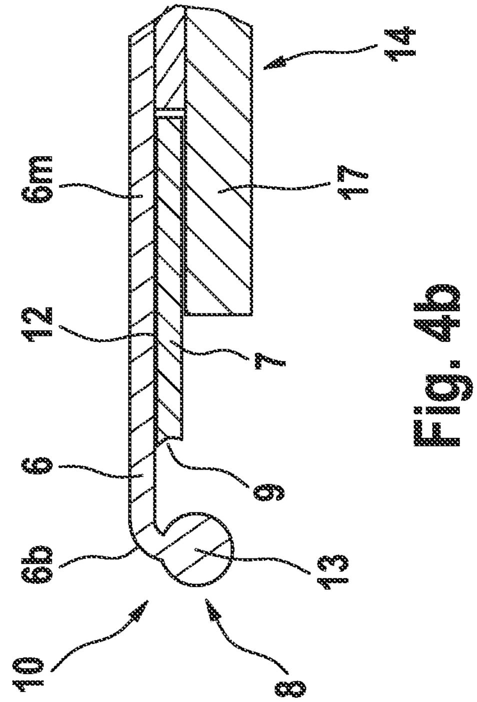
Figure 6:
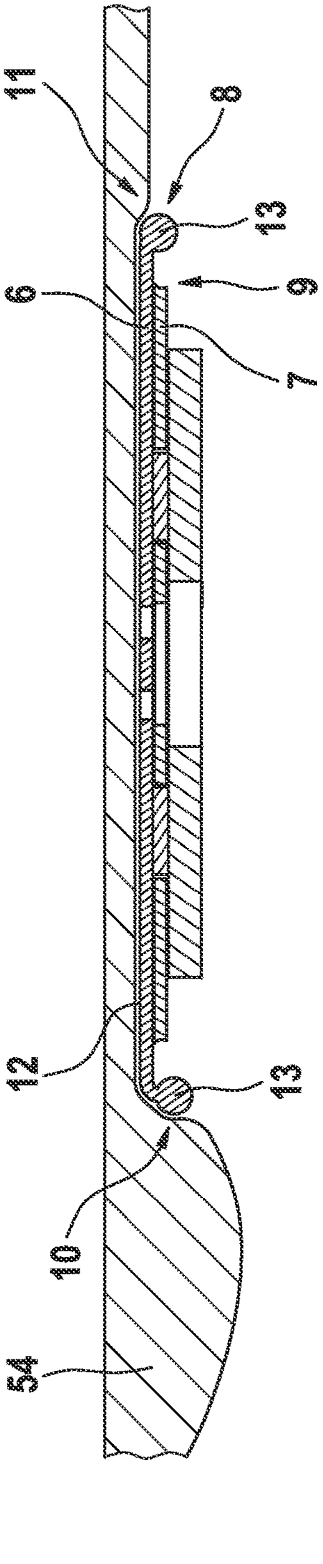
Figure 7A:
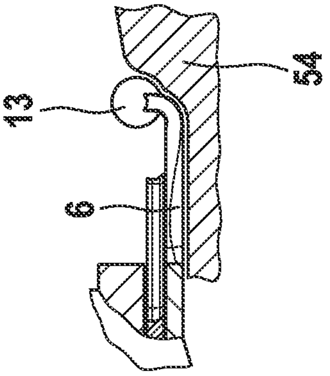
FIG. 7*a*-7*d*: cross sectional views of the engagement of the tooth tip with the skin to be shaved according to different use options, wherein view (a) shows a smoothly configured tooth tip for close cutting in a fork mode, view (b) shows the smoothly configured tooth tip in a rake mode, view (c) shows an aggressively configured tooth tip for thorough cutting used in a fork mode and view (d) shows the aggressively configured tooth tip of view (c) in a rake mode.
Figure 7B:
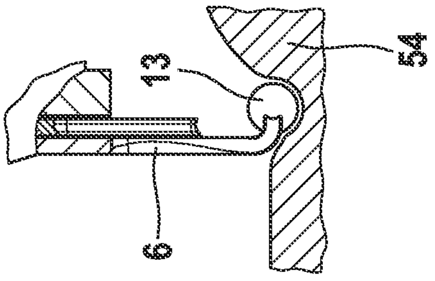
Figure 7C:
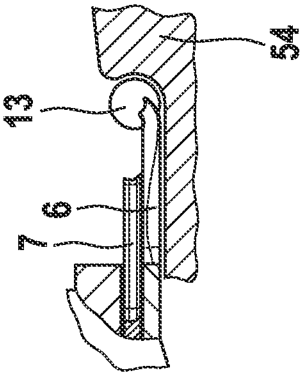
Figure 7D:
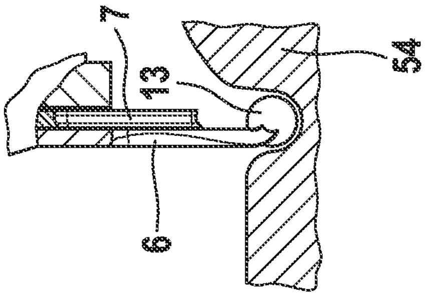

A height h including the entire contour of the thickening 13 and the tooth main portion **6*m* as measured in a direction perpendicular to the skin contact surface 12, may range from 300 to 550 μm to eliminate the risk of penetration when the cutting system is applied in parallel to the skin as it is shown in FIGS. 4 and 6. The enlargement at the end of the tooth 6 for example in form of a sphere or a drop eliminates the risking case of a perpendicular application as it is shown in FIGS. 7*b* and 7*d*. The additional bending of the bent portions 6*b*** with the aforementioned bending radius R up to 400 μm gives an optimal perception of guide with acceptable impact on hair capture.

As shown by FIG. **5*a*, the overhang o defining the length of protrusion of the overhanging teeth 6 beyond the teeth 7 of the other cutting element 5, may range from 400 to 800 μm or 400 to 600 μm. When the cutter system is used like a rake as it is shown in FIGS. 7*b* and 7*d*, such overhanging length o is helpful to prevent the reciprocating teeth 7 of cutting element 5** from touching and irritating the skin.

So as to allow for a close cut, the teeth may have a rather reduced thickness t and/or the thickness t of the teeth 6 and 7 may be adjusted to the gap 22 between pairs of neighboring cutting teeth 6 and 7. Due to the aforementioned described bulging effect of the skin, it may be advantageous to have a teeth thickness t, at a main portion **6*m* of the teeth 6, ranging from 50 to 150 μm or 30 to 180 μm. The teeth 7 of the other cutting element 5** may have the same thickness t.

The gaps 22 between each pair of neighboring cutting teeth 6 and 7 may have a gap width $g_w$ ranging from 150 to 550 μm or 200 to 500 μm.

The width tw of the teeth 6 and/or of the teeth 7 may range from 200 to 600 μm or 250 to 550 μm. As shown by FIG. **5*b*, the width tw of the teeth 6 and 7 may be substantially constant along the longitudinal axis of the teeth. Nevertheless, it would be possible to give the teeth 6 and 7** a slightly V-shaped configuration, wherein the width tw may decrease towards the tips. In such case, the aforementioned width ranges applied to the width tw measured in the middle of the longitudinal extension.

So as to give the user the choice between a more aggressive, closer cutting action on the one hand and a less intensive, more pleasant skin feel on the other hand, the cutter system provides for two separate rows 10, 11 of cooperating teeth 6 which are different from each other in terms of shape and/or size and/or positioning of the thickened and/or rounded tooth tips 8 of the teeth 6. Thus, using a first row 10 of cooperating cutting teeth 6 may provide for a more aggressive, closer cutting action, whereas using a second row 11 of cutting teeth 6 may provide for a less intensive, more pleasant skin feel. The configuration of the tooth tips 8, in particular the configuration of the curvature and thickening thereof may considerably influence the cutting performance and allow the user to choose between closeness, thoroughness, soft skin feel and efficiency.

More particularly, the rows 10, 11 of cooperating teeth 6 may differ from each other in terms of the height of the tooth tips 8 which is, at least in part, defined by the position of the thickening relative to the main portion of the teeth 6 and the size and shape thereof. At one row 10, the thickening may protrude only to the side opposite to the skin contact surface what may be achieved, for example, by bending or curving the teeth portions at which the tip thickenings are attached, away from the skin contact surface and/or attaching the thickening to the main portion of the teeth 6 in an eccentric way, in particular a bit offset away from the skin contact surface. On the other hand, at a second row 11 of cooperating teeth 6, the thickenings at the tooth tips 8 may protrude to both sides of the teeth 6, i.e. to the skin contact surface and to the side opposite thereto.

Said asymmetric rows 10, 11 of cooperating teeth 6 may differ in the heights of the teeth 6 having the overhanging thickened and/or curved tooth tips 8. The height of the teeth 6 may be measured substantially perpendicular to the skin contact surface of the main portion of the teeth 6 and/or perpendicular to a longitudinal axis of the teeth 6, and may include the contour of the thickening at the tips and the upper and/or lower contour of the main portion of the teeth 6. When the thickening protrudes away from the skin contact surface and/or the teeth 6 are curved away from said skin contact surface, the height may span from the lowest point of the thickening to the upper surface of the main portion of the teeth defining the skin contact surface thereof.

Such heights may differ from row to row. More particularly, at one row 10 the height of the cutting teeth 6 having the overhanging tooth tips 8 may range from 400 to 600 μm or 450 to 550 μm, whereas the height at the other row 11 may range from 300 to 500 μm or 350 to 450 μm. All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A cutter system for an electric shaver or a trimmer, comprising a pair of cooperating cutting elements and a support element, wherein one of said cutting elements comprises a main portion and lateral ends that define lateral protection elements having rounded and chamfered edge contours, the main portion of the one cutting element defining a skin contact surface, wherein the main portion of the one cutting element is positioned between said lateral protection elements, wherein the rounded and chamfered edge contours of said lateral protection elements being bent or curved away from the skin contact surface of the main portion of the one cutting element and enveloping a gap movably receiving the other cutting element.

2. The cutter system according to claim 1, wherein each of said lateral protection elements comprises a first protective portion extending generally parallel with a longitudinal edge of said main portion of the one cutting element, a second protective portion extending generally parallel with a lateral edge of the main portion of the one cutting element and a rounded corner protective portion connecting with said first and second protective portions, wherein said first, second and corner protective portions of each of said lateral protection elements form the rounded and chamfered edge contours of said lateral protection elements.

3. The cutter system according to claim 2, wherein the rounded corner protective portion has a lateral bend radius ranging from 500 to 1500 μm.

4. The cutter system according to claim 1, wherein the rounded and chamfered edge contours of said lateral protection elements have a bending radius which is ranging from 400 to 1000 μm.

5. The cutter system according to claim 1, wherein a seaming portion connecting the rounded and chamfered edge contours of the lateral protection elements to the main portion of the one cutting element has a reduced thickness in comparison to the main portion and to said rounded and chamfered edge contours, or comprises a notch.

6. The cutter system according to claim 1, wherein each of the lateral protection elements includes at least one slot in a rounded corner portion of each of the lateral protection elements.

7. The cutter system according to claim 1, wherein the one cutting element has tooth tips overhanging tooth tips of the other cutting element, wherein said overhanging tooth tips are provided with a two-step rounding including a spherical, drop-shaped or pearl-shaped thickening and a bend portion connecting said thickening to a main tooth portion and bent away from a skin contact surface of said main tooth portion.

8. The cutter system according to claim 7, wherein said bend portion has a bending radius ranging from 200-400 μm, and said thickening has a diameter ranging from 300-550 μm, and an overhanging length defining a length of a protrusion of the overhanging tooth tips beyond the tooth tips of the other cutting element ranging from 400-800 μm.

9. The cutter system according to claim 1, wherein the one cutting element comprises cutting teeth, the cutting teeth at a main tooth portion providing for cutting action, have a tooth width ranging from 250-550 μm and a thickness ranging from 50-150 μm, wherein the cutting teeth have a tooth height including the rounded, thickened tooth tips ranging from 300-550 μm and define a gap between neighboring cutting teeth, having a gap width ranging from 200-500 μm.

10. The cutter system according to claim 1, wherein the one cutting element comprises different rows of cutting teeth, the different rows of cutting teeth have skin contact surfaces which are coplanar to each other.

11. The cutter system according to claim 1, wherein the other cutting element is sandwiched between the one cutting element and said support element, wherein at least one spacer defines said gap in which the sandwiched other cutting element is movably received, said spacer and said gap having a thickness larger than the thickness of the sandwiched other cutting element, wherein said support element, said spacer and the one cutting element form a rigid sandwiching frame having the gap in which the sandwiched other cutting element is slidably received.

12. The cutter system according to claim 1, wherein said rounded and chamfered contours of the lateral protection elements are integrally formed with the main portion of the one cutting element.

* * * * *